US005315698A

United States Patent [19]

Case et al.

[11] Patent Number: 5,315,698

[45] Date of Patent: May 24, 1994

[54] METHOD AND APPARATUS FOR VARYING COMMAND LENGTH IN A COMPUTER GRAPHICS SYSTEM

[75] Inventors: Colyn Case, Amherst, N.H.; Kim Meinerth, Middleton, Mass.; John Irwin, Hudson, N.H.; Blaise Fanning, Overland Park, Kans.

[73] Assignee: Digital Equipment Corporation, Maynard, Mass.

[21] Appl. No.: 748,354

[22] Filed: Aug. 21, 1991

[51] Int. Cl.$^5$ .............................................. G06F 15/20

[52] U.S. Cl. ...................................... 395/162; 395/375

[58] Field of Search ........ 395/100, 118, 375, 162–164, 395/166, 200; 340/721, 747

[56] References Cited

U.S. PATENT DOCUMENTS

| | | | |
|---|---|---|---|
| 5,001,653 | 3/1991 | Buchanan et al. | 395/102 |
| 5,010,515 | 4/1991 | Torborg, Jr. | 395/250 |
| 5,155,821 | 10/1992 | Sone et al. | 395/375 |

*Primary Examiner*—Dale M. Shaw
*Assistant Examiner*—Kee M. Tung
*Attorney, Agent, or Firm*—Clayton L. Satow; Barry N. Young; Albert P. Cefalo

[57] ABSTRACT

In a computer graphics system, an address generator processes physical and virtual addresses using a common command set. A separate translator provides conversion from generated virtual addresses to physical addresses. The address generator formulates addresses as a function of distance from the origin of desired destination area in destination memory to the requested position in the destination area. A plurality of drawing graphics commands specify different raster drawing operations. A plurality of context graphics commands is used to define a desired context in which drawing graphics commands operate. The defined context includes destination location for resulting data, type and plane depth of graphics operations, foreground and/or background color of resulting data. Different parts of the context are changeable/redefinable independently of the other parts. The graphics commands have a format of multiple fields. Different fields specify different parameters. For each graphics command, the fields are arranged in order of common use of the corresponding parameter such that fields of less commonly used parameters are at an omittable end of the format. Thus, length of each graphics command varies as a function of parameters specified in the graphics command. A desired set of raster drawing commands delimited by a beginning indicator and an end indicator form a drawing unit.

8 Claims, 13 Drawing Sheets

METHOD AND APPARATUS FOR VARYING COMMAND LENGTH IN A COMPUTER GRAPHICS SYSTEM

BACKGROUND OF THE INVENTION

A typical computer graphics system employs a memory source of data to be displayed, an address generator, a graphics controller, and a video display unit (e.g., CRT and the like). Graphics commands are transmitted from a host processor and are written to a register interface. Operands of the graphics commands are stored on the graphics controller. Common variations of this include:

(1) the graphics controller reads graphics commands only from main memory via physical dma;

(2) the graphics controller reads graphics commands from physical main memory and can move operands between graphics controller memory and main physical memory. However, graphics operations cannot occur until the data is in graphics controller memory.

The stored operands include source addresses (i.e., main memory addresses) of data to be displayed and so-called destination addresses (i.e., memory locations in a frame buffer that supports the video display). Under the control of timing signals, the address generator provides appropriate pairs or sequences of operand addresses while the graphics controller sequentially operates on respective data to generate desired screen views on the video display unit. In particular, the graphics controller reads memory data into the frame buffer with respective source data being placed at respective destination addresses in the frame buffer. Thereafter, graphics controller provides display of data through the display unit by enabling sequential reading of the contents of the frame buffer. That is, the frame buffer supports raster scanning from a first line through succeeding lines of the screen view on the display unit such that the screen view is continuously refreshed.

Existing problems or disadvantages of computer graphics systems of the prior art include:

- Lack of direct access of virtual memory and lack of write access to main memory;
- The address generator can only draw to its own memory, i.e., the frame buffer or a graphics-private memory. This is a cost disadvantage, and in the case of large operands can be a perfomance disadvantage;
- The application/program (client) requesting execution of a graphics command is required to provide physical addresses if the graphics controller has the capacity to access main physical memory. Furthermore, if a graphics operation spans virtual pages, the client program must segment and translate virtual memory boundaries for each graphics operation so they don't span physical pages;
- High overhead for context setup, i.e., setup commands, to support a series of graphics operations and clip list processing commands.

SUMMARY OF THE INVENTION

The present invention provides a computer graphics system that addresses the problems of prior art. In particular, the present invention provides direct access of main memory by the graphics system (i.e., main memory access without host processor action). With respect to the address generator, the frame buffer is separately accessible (i.e., non-dedicated) as are I/O devices and main memory. Further, the address generator processes virtual as well as physical memory addresses such that requesting applications/programs or the host processor are no longer required to translate virtual memory addresses. In addition, graphics commands are configured to minimize redundancy in setup of graphics operations and clip list processing.

In accordance with one aspect of the present invention, a common command set is employed to process virtual memory addresses and physical memory addresses alike. Addressing is then as follows. A destination memory has an initial memory position from which positions in the destination memory are addressed. A desired destination area has an origin within the destination memory. For a given position in the destination area relative to the origin of the destination area, the present invention determines a working distance from the origin to the given position along one axis (e.g., along a scanline). The present invention forms a destination memory address of the given position (relative to initial memory position of the destination memory) as a function of the determined working distance. In particular, the determined working distance is summed with a differential distance. The differential distance is defined as the distance between the origin of the destination area and the initial memory position of the destination memory, along the one axis. Further, the present invention forms source memory addresses and stencil memory addresses each as a function of the determined working distance.

In accordance with another aspect of the present invention, clip list processing employs a list-setting command and entities called "drawing units" which correspond to series of desired raster drawing commands. Each such series of desired drawing commands is delimited by a beginning indicator and an ending indicator. For each drawing unit, a memory list indicating desired destination areas (i.e., clip rectangles) is formed. That is, the memory list has a different entry for each desired destination area, and each entry provides the memory address for accessing the corresponding destination area. A list-setting command indicates memory address of the memory list and is stored in the system command buffer immediately preceding the corresponding drawing unit. The commands held in the command buffer are sequentially executed such that the list-setting command is executed before the series of drawing commands in the drawing unit. In response to the list-setting command, the present invention (i) accesses the memory list with the memory address indicated in the list-setting command, and (ii) sequentially reads the entries in the memory list, and for each entry executes the series of drawing commands as delimited in the drawing unit. To that end, the series of drawing commands is executed once for each desired destination area listed in the memory list, while being stored as a single occurrence in the command buffer. Thus, each drawing unit effectively serves as a processing loop in the command buffer.

Further multiple drawing units may be executed against the same memory list. In a preferred embodiment, a control flag resets a pointer to the next drawing unit so that an additional list-setting command is not required.

In accordance with a further aspect of the present invention, raster drawing commands are partitioned from set-up (or context) commands. The latter commands are used to define a context in which drawing commands operate to provide desired graphics operations on specified data. The context includes destination location for resulting data, type of graphics operation, foreground color of resulting data and background color. Different set-up/context commands define different parts of the context independent of other parts of the context. To that end, context may be redefined by using a single set-up/context command to redefine one part of the context. The other parts of the context remain as previously defined. In the preferred embodiment, the context commands include commands for defining clip list processing and commands for defining type of graphics operations separately from clip list processing.

In accordance with another aspect of the present invention, a command format enables length of the graphics system commands to vary. In particular, the command format includes a multiplicity of fields. Different fields are used for specifying different parameters of the graphics commands. The fields are arranged in order of common use such that less commonly used fields are at an omittable end of the format. As a result, length of each command varies as a function of parameters specified in the command.

To accomplish the foregoing, the command format includes a length field for indicating present length of the command. A flag field provides flags for inhibiting automatic updating (i.e., incrementing or decrementing) of pixel position on a given scanline in working memory, for inhibiting automatic updating (incrementing or decrementing) of a scanline in working memory, and for indicating direction of processing along an axis in a working memory.

Thus, the objects and advantages of the present invention are:

- a computer graphics system that uses virtual main memory for offscreen operands. This eliminates the cost of maintaining graphics-private memory, eliminates overhead of moving operands in and out of graphics controller memory and simplifies the programming model;
- a computer graphics system that implements various other functions in main memory which are typically implemented with graphics-private memory;
- a computer graphics system that provides an efficient programming interface and serves as an independent graphics coprocessor that involves minimal to no CPU processing.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

As used herein, the following terms have the following definitions:

"Multi-plane" refers to a drawable surface which is deeper than one plane such that each pixel of the drawable surface is defined by two or more bits of data. For example, the term multi-plane may indicate an 8-bit-per-pixel colored window, pixmap, or image.

"Monochrome" indicates a single plane (one bit per pixel) window, pixmap, or image.

"Stencil" is a single plane image or bit map which is at least the size of the unclipped portion of the destination.

"Tile" is a term used generically to describe a source which, since it is smaller than the destination, must be "wrapped" one or more times in both X and Y in order to fill up the destination.

"Stipple" is a special case of tile where the source is single plane and the destination is either single or multiple plane.

"Strip" is a subset of tile. Basically, a strip tiles in X but not in Y. The destination, therefore, must be of the same height as the source.

"Operand" refers to a working memory area to serve as a subject of a graphics operation. In particular, "operand" takes on the meaning of SOURCE, DESTINATION and/or STENCIL to reference a source memory area, a destination memory area, and a stencil memory area as a second source, respectively.

References to "Y" indicate a particular scanline in a desired memory area, and references to "X" refer to pixel position on a given scanline.

"Octaword" is four 32-bit words.

Figure 1A:
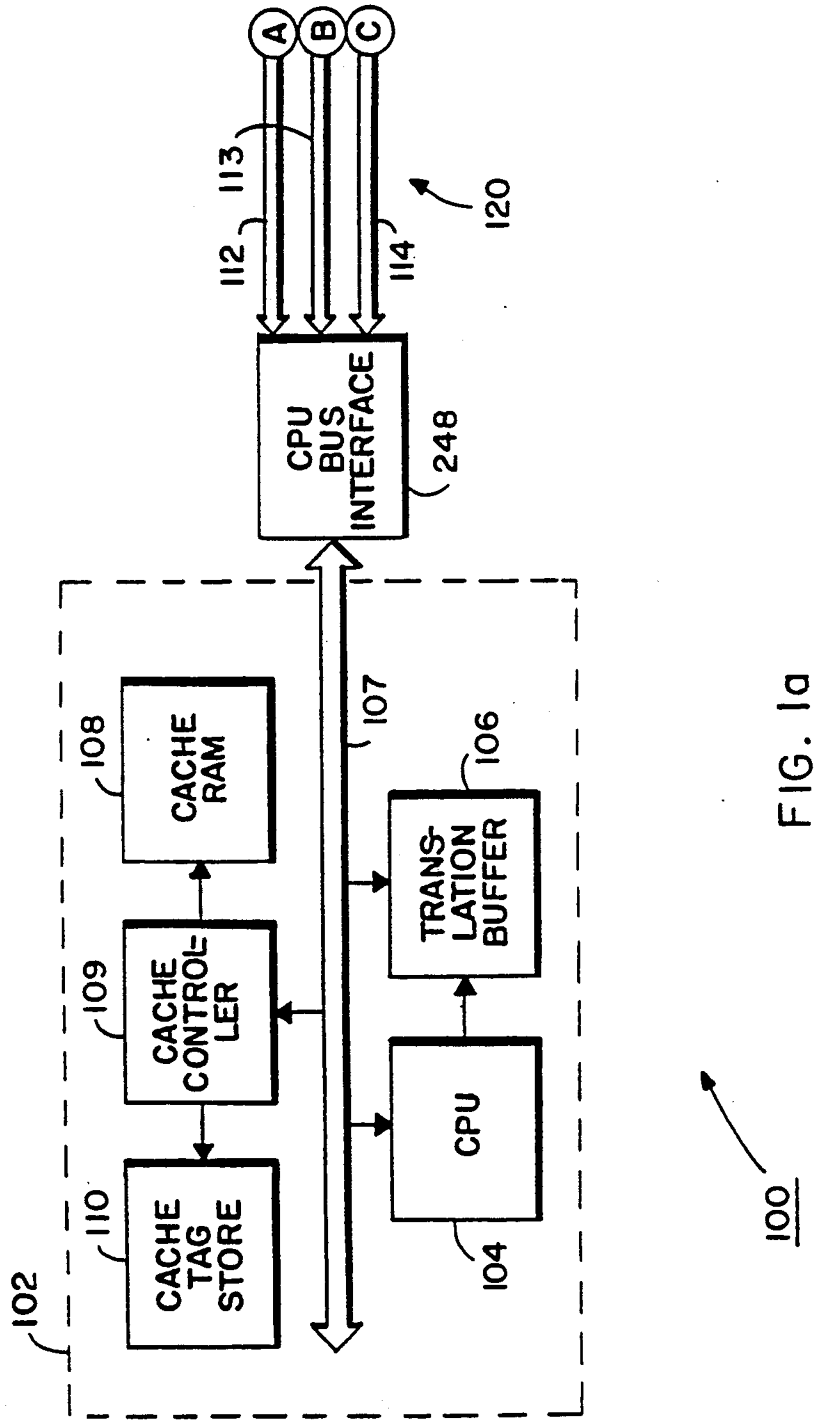
FIG. 1*a* and 1*b*, hereinafter collectively referred to as FIG. 1, are two portions of a block diagram of a computer graphics system according to the present invention.
Figure 1B:
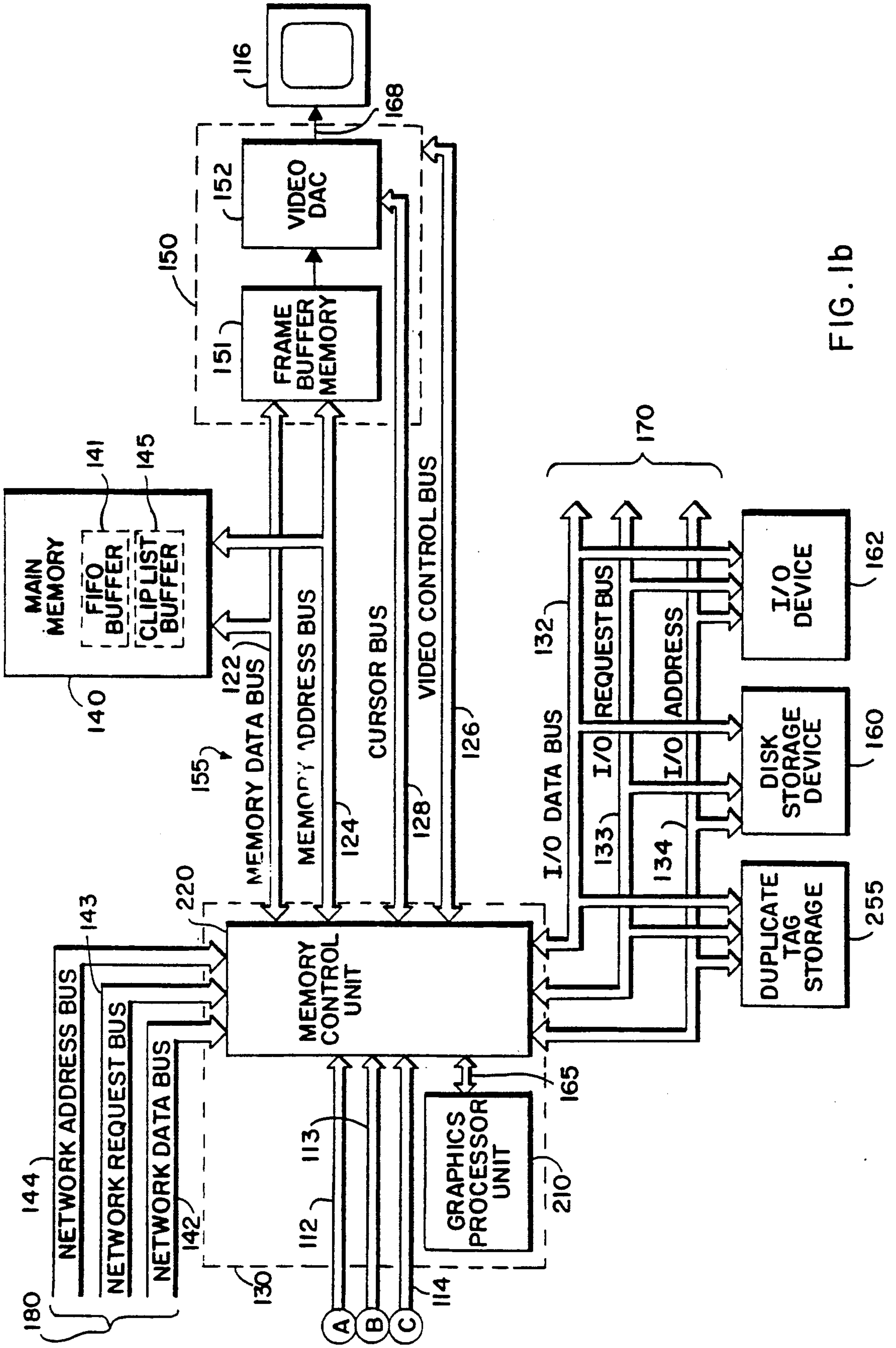

FIG. 1 shows a block diagram of a computer graphics generation system 100 according to the present invention. Depending on configuration, computer graphics generation system 100 may be incorporated within a single-user workstation or a multi-user computer, or may be connected to a computer network by network bus 180 as shown. The computer graphics generation system 100 includes functional units such as a processor unit 102 (depicted within a broken-line block) interconnected via a CPU bus interface 248 to a system bus, generally designated 120, for communication with a memory/graphics control unit 130. The system bus 120 is effectively shown as a plurality of buses, designated 112, 113, and 114, each of which respectively, transfers data information (bus 112), request information (bus 113) and address information (bus 114). Memory data and memory address buses 122 and 124 connect in series the memory/graphics control unit 130, a main memory 140, and a video unit 150 (shown in broken lines). Video unit 150 in turn controls the display unit 116. The video unit 150 includes therein a frame buffer memory 151 for holding pixel data or pixmaps of the screen view displayed on display unit 160, and a digital-to-analog converter (DAC) 152.

The memory/graphics control unit 130 is interconnected to a plurality of bus structures, each of which is bidirectional for data/address transfers through, to and from the control unit 130. Such bus structures include the video unit 150 control bus structure, that is, video control bus 126 and the cursor bus 128; the I/O bus structure 170, formed of I/O data bus 132, I/O request bus 133 and I/O address bus 134; and a network bus structure 180, such as data bus 142, request bus 143 and address bus 144. Connected to the I/O bus structure 170 may be any type of peripheral device, such as disk storage unit 160 and any other suitable I/O device 162. Also connected to I/O buses 170 for enabling access to main memory 140 is a duplicate tag store 255.

Further details of each of the foregoing elements and other elements in FIG. 1 may be found in the cofiled Patent Application entitled "Computer Graphics System" by Kim Meinerth, et al, and assigned to the assignee of the present invention. That application is herein incorporated by reference, certain details of computer graphics system 100 being repeated hereafter only as necessary for understanding the present invention.

The components of computer graphics generation system 100, and in particular those components and buses surrounding graphics control unit 130, are arranged such that reading from memory, writing to memory and other operations are performed without any action by processor unit 102. More specifically, without action by processor unit 102:

(i) graphics control unit 130 can access main memory 140, frame buffer memory 151 directly, and can reference disk storage unit 160, and I/O devices 162 directly;

(ii) graphics control unit 130 can transfer information between main memory 140 and frame buffer memory 151 within video unit 150; and·

(iii) graphics control unit 130 can transfer information between both main memory 140 and frame buffer memory 151 and devices connected to network bus structure 180 or I/O bus structure 170.

The foregoing is accomplished, in part, by the same memory data and address buses 122 and 124 being used by graphics control unit 130 to access main memory 140 and frame buffer memory 151. Said another way, memory address bus 124 supports graphics control unit 130 memory access with any address ("physical" to main memory 140 or "virtual" to frame buffer memory 151) so that graphics control unit 130 can address any memory space either virtually or physically on memory address bus 124. As such, graphics control unit 130 utilizes a common command set for processing physical addresses (of main memory 140) and virtual addresses (of frame buffer memory 151) alike. To that end, physical addresses and virtual addresses are treated similarly by graphics control unit 130 within computer graphics generation system 100.

Figure 2A:
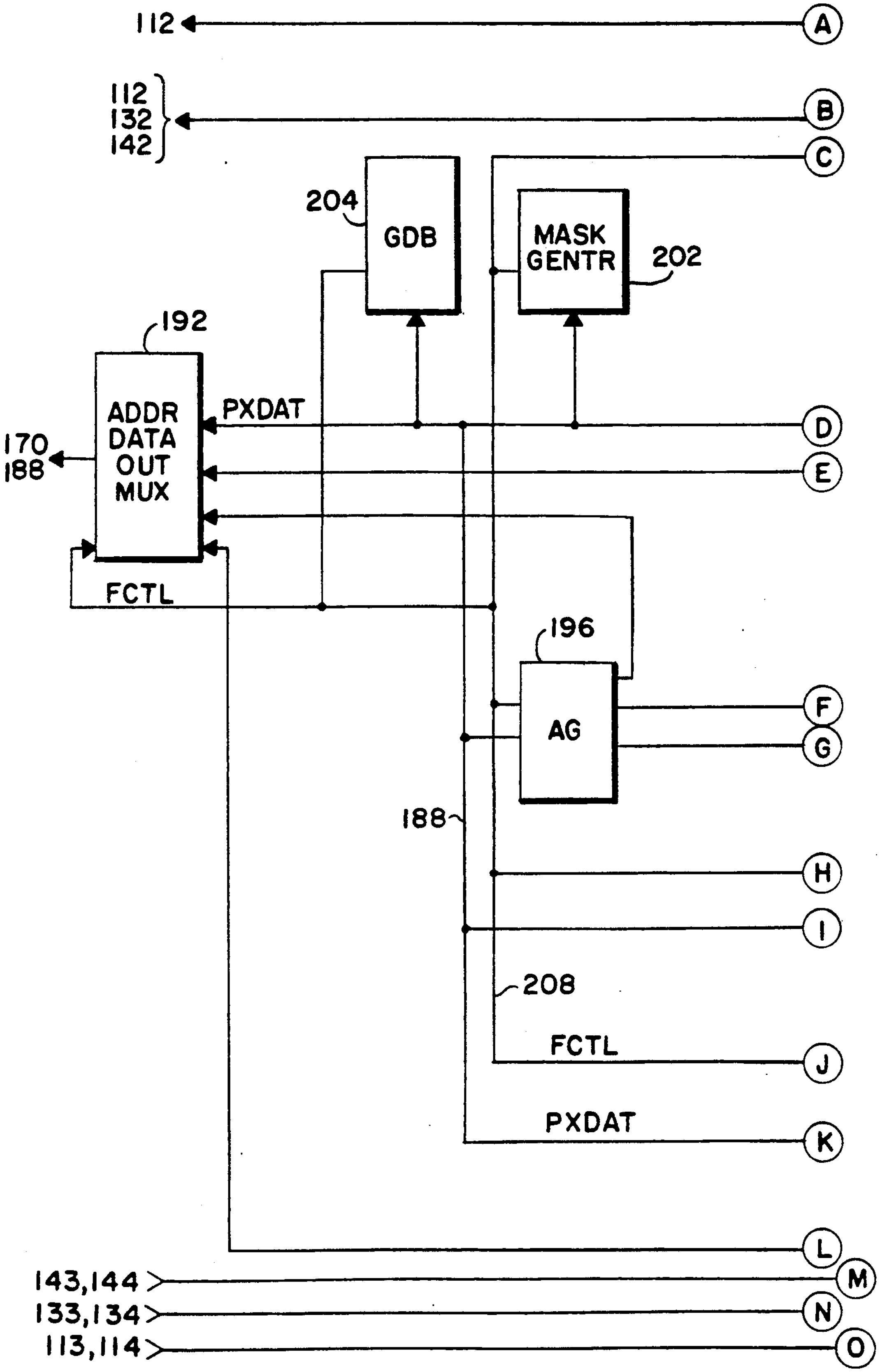
FIGS. 2*a* and 2*b*, hereinafter collectively referred to as FIG. 2, are two portions of a detailed schematic of a graphics control unit employed in the computer graphics system of FIG. 1.
Figure 2B:
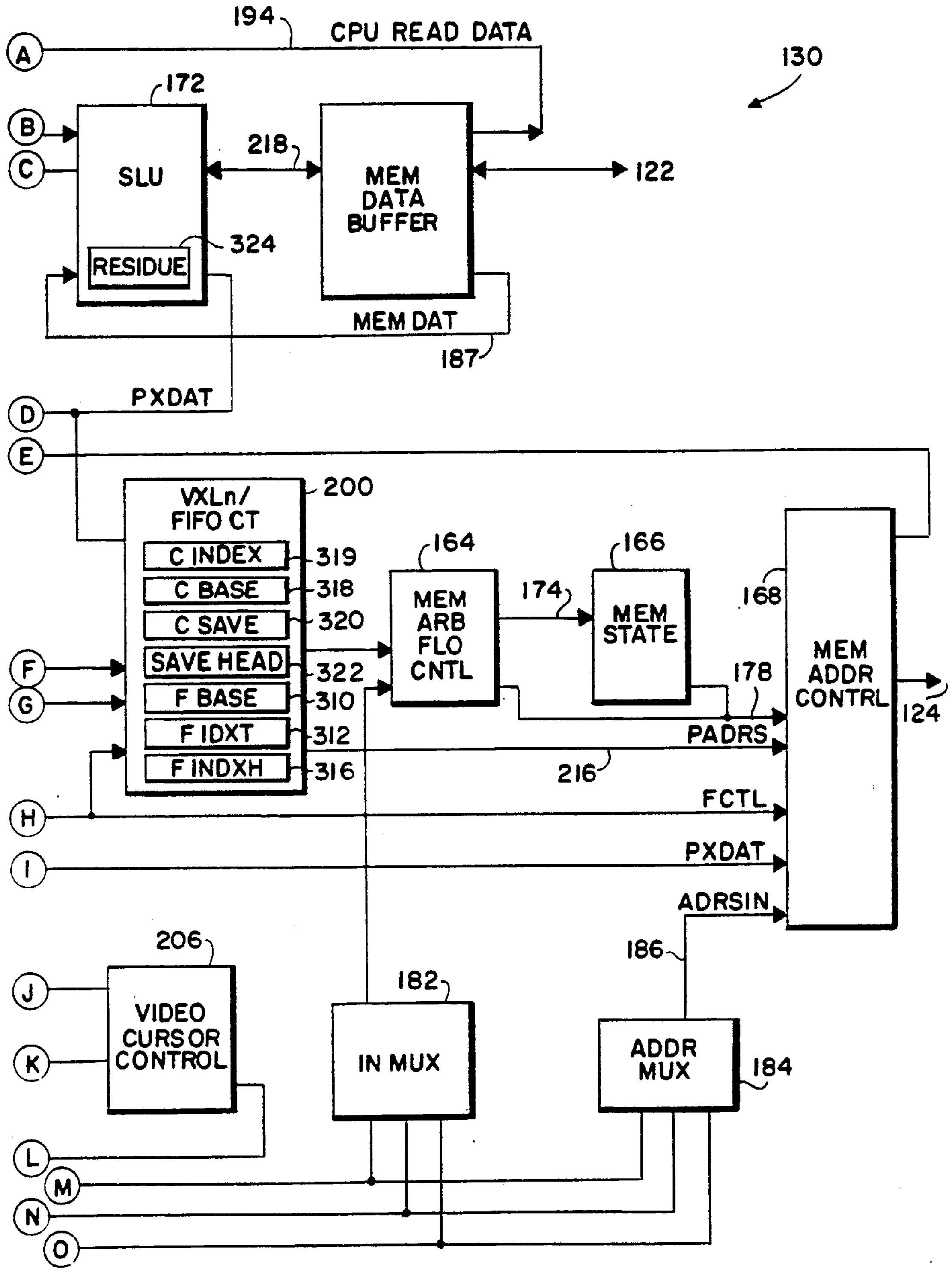

The method by which graphics control unit 130 accomplishes the foregoing may be more easily seen by reference to FIG. 2. Graphics control unit 130 consists of two functional parts, a memory control portion 220 and a graphics processor portion 210. The graphics processor portion 210 is formed of an address generator 196, pixel shift logic unit (pixel SLU) 172, virtual translation/FIFO control unit 200, mask generator 202, graphics data buffer 204, and video/cursor controller 206, all interconnected by two signal lines, the pixel data bus (PXDAT) 188, and flow control bus (FCTL) 208. The various graphics processor portion 210 elements are also connected by a number of signal lines, which will be explained as they are relevant to the description of the operation of the graphics processor portion 210. The memory control portion 220 consists of arbitration and flow control unit 164, memory state unit 166, memory address and control unit 168, and memory data buffer 169, among other working multiplexes and interfaces. Pixel SLU 172 is a part of both memory control portion 220 and graphics processor portion 210 for reasons that will be apparent later.

Certain of the component units of memory control portion 220 communicate various types of information over the various bus structures of FIG. 1. Flow control unit 164 receives memory requests from respective incoming portions of the system request bus 113 (of FIG. 1), the I/O request bus 133 (of FIG. 1), and the network request bus 143 (of FIG. 1). Flow control unit 164 (FIG. 2) acknowledges memory requests through an external acknowledgement line which connects to respective outgoing portions of the system request bus 113 (of FIG. 1), the I/O request bus 133 (of FIG. 1), and the network request bus 143 (of FIG. 1). The memory address and control unit 168 receives the address portion of a memory request over a respective incoming portion of the system address bus 114 (of FIG. 1), the I/O address bus 134 (of FIG. 1), or the network address bus 144 (of FIG. 1). Address/data output multiplexer 192 sends data on respective outgoing portions of the I/O data bus 132 (of FIG. 1) and the network data bus 142 (of FIG. 1), and sends address information over respective outgoing address portions of the I/O address bus 134 (of FIG. 1) and the network address bus 144 (of FIG. 1). Data is received by pixel SLU 172 over respective incoming data portions of system data bus 112 (of FIG. 1), I/O data bus 132 (of FIG. 1), and network data bus 142 (of FIG. 1). Memory address and control unit 168 sends address and control information over memory address bus 124 to main memory 140 (of FIG. 1) and frame buffer memory 151 (of FIG. 1). Memory data buffer 169 sends data to and receives data from main memory 140 (of FIG. 1) and frame buffer memory 151 (of FIG. 1) over memory data bus 122, and also sends data to CPU bus interface 248 (of FIG. 1) over the outgoing data portion of system bus 112 (of FIG. 1).

Further descriptions of the interconnections and interaction between the components of graphics control unit 130 is provided next in an illustrative, non-limiting example of a memory request by disk storage unit 160. A memory request includes request information, which contains information about the requester, and address information, which contains the memory address of the requested data. The request and address information are processed separately.

The request information for a memory read is transmitted from disk storage 160 over request portion 133 of I/O bus structure 170, to request input multiplexer 182 which transmits the request to flow control unit 164. Flow control unit 164 prioritizes the request and transmits request information over transmission line 174 to memory state unit 166. Information transmitted includes information about the requester (in this example, disk storage unit 160), access type, and operand size. Memory state unit 166 transmits the request information to memory address and control unit 168 over request identification line 178.

The address information of the memory location that is requested is transmitted over address portion 134 of I/O bus structure 170 and is multiplexed through address input multiplexer 184. Address input multiplexer 184 then transmits the memory address information directly to memory address and control unit 168 over "address in" (ADRSIN) line 186.

Memory address and control unit 168 sends the request information received over line 178, according to the memory address information received over line 186, to main memory 140 on memory address bus 124. Contents of the requested memory address are returned over memory data bus 122 to memory buffer 169 and are then sent to pixel SLU 172 over memory data (MEMDAT) line 187. Pixel SLU, in turn, transmits the data over pixel data bus (PXDAT) to address and data output muliplexer 192. Multiplexer 192 transmits the data to the device that requested the memory read, namely disk storage unit 160, over I/O bus structure 170.

A request for a memory read by processor unit 102 proceeds in the same manner, except upon receipt of the contents of the requested memory address, memory data buffer 169 transmits the data to processor unit 102 over CPU memory read data line 194 which relays to system data bus 112 of FIG. 1. Those familiar with the art will appreciate from this example that writes to main memory 140 by processor unit 102 and I/O devices 160, 162 can be accomplished in a like manner, and that reads from or writes to main memory 140 by other devices attached to one of the bus structures of FIG. 1 is similarly accomplished. It can also be noted that the memory request by disk storage unit 160 and similar I/O devices 162 proceed without any action by processor unit 102.

Requests for memory read or writes by graphics control unit 130 are as follows. Generally, such memory requests are in conjunction with graphics commands being executed by address generator 196 (discussed later) in graphics control unit 130. Address generator 196 issues memory requests over address generator request line 212, to virtual translation/FIFO control unit 200. Virtual translation/FIFO control unit 200 in turn transmits the request to flow control unit 164, which transmits the request to memory address and control unit 168 over line 178. The address portion of the memory request is calculated by address generator 196 (discussed later) and transmitted to virtual translation/FIFO control unit 200 over address generator address line 214. The address is translated, if necessary, to a physical address by virtual translation/FIFO control unit 200 in a manner described in the related Applications. The address is then sent to memory address and control unit 168 over physical address (PADRS) line 216. After receipt of the physical address from virtual translation/FIFO control unit 200 and the read/write request from flow control unit 164, memory address control unit 168 transmits the memory address and the request information over memory address bus 124 to main memory 140. The requested data is returned over a memory data bus 122 to memory data buffer 169, which in turn transmits the data to pixel SLU 172 for processing by a command executed by address generator 196.

In sum with reference to FIG. 1, access requests by the graphics processor portion 210 (of graphics control unit 130) are transferred directly to memory control portion 220, by signal lines 165 comprising request line 212 and address line 214 of FIG. 2. Such direct transfer avoids access requests having to be transmitted over the system bus 120, memory bus structure 155 (containing memory buses 122 and 124), or I/O bus 170.

It is noted, the method of memory access by graphics control unit 130 and the method of memory access by other system components both involve transmitting request information to flow control unit 164, and a memory address to memory address and control unit 168. It is again noted that the main memory access is executed in both cases without any action by processor unit 102.

Continuing with FIG. 1, graphics commands are transmitted from processor unit 102 as writes to a defined range of addresses in memory. The CPU 104 writes graphics commands and other writes to memory into a translation buffer 106 for translation and formatting. Translation buffer 106 then sends its contents to CPU bus interface 248 over CPU bus 107. CPU bus interface 248 examines the addresses of the writes to memory to see if there are addresses in the range of addresses designated for graphics commands. If the write to memory contains a graphics command, CPU bus interface 248 changes a bit in the request portion of the write to memory to indicate that the write to memory is a graphics command. The request portion of the write to memory is sent along an incoming portion of system request bus 113, where it is received by flow control unit 164 shown in FIG. 2. Flow control unit 164 reads the bit that indicates that the write to memory contains a graphics command. Depending on a control field generated by virtual translation/FIFO control unit 200, flow control unit 164 signals memory address and control unit 168 that the write to memory (graphics command) should be sent to one of three locations: (i) the FIFO command buffer 141, which is a data structure residing in main memory 140, (ii) the PXDAT line as valid data for address generator 196, and (iii) FIFO residue buffer 324 where address generator 196 is currently unable to read new data.

For case (i) above, the address in FIFO command buffer 141 to which the graphics command is to be sent is calculated in the virtual translation/FIFO control unit 200 as follows. FIFO command buffer base register latch 310 stores the base address, i.e., the memory address of the beginning of the 64K byte block of memory where FIFO command buffer 141 resides. FIFO command buffer tail index latch 312 stores the number of FIFO positions between the base address of the FIFO command buffer and the tail, i.e., the next available position in the FIFO command buffer to which to write. The contents of the FIFO command buffer tail index latch 312 and the FIFO command buffer base register latch 310 are combined to yield the memory address in the FIFO command buffer 141 to which the graphics command is to be sent. This address is provided to the memory address and control unit 168 which was previously signaled that the next write to memory is a write to FIFO command buffer 141. In turn, memory address and control unit 168 transmits the computed address on memory address bus 124.

The data portion of the write to memory, that is, the graphics command itself, is sent along an incoming portion of system data bus 112 to pixel SLU 172. Pixel SLU 172 sends the graphics command over memory data out line 218 to memory data buffer 169, which transmits the data on memory data bus 122 to FIFO command buffer 141.

When a graphics command is fetched from the FIFO command buffer 141 for processing, the fetching is processed as a memory request. Virtual translation/FIFO control unit 200 generates the address for the memory request and issues the memory request to the memory address and control unit 168. In particular, a FIFO command buffer head index latch 316 stores the address of the next octaword to be read where command data is read from memory as aligned octawords. In this case, the next octaword to be read is the next-to-be-read command of the FIFO command buffer. The virtual translation/FIFO control unit 200 multiplexes and combines the contents of the FIFO command buffer head index latch 316 and the contents of FIFO command buffer base register latch 310. Virtual translation/FIFO control unit 200 transmits the resulting address on the physical address bus (PADRS) 216 to memory address and control unit 168, for transmission to the memory address bus 124. The fetched graphics command is returned from FIFO command buffer 141 on memory data bus 122 to memory data buffer 169, and the pixel SLU 172 over MEMDAT line 187. Pixel SLU 172 in turn transmits the graphics command to address generator 196 over pixel data bus (PXDAT) 188 or to the FIFO residue buffer 324 when address generator 196 is unable to currently read new data.

In executing graphics commands to draw to a window displayed on display unit 116, graphics commands (or sets thereof) are alternately fetched from FIFO command buffer 141 and a clip list command buffer 145 (FIG. 1). Generally, if the graphics command fetched from FIFO command buffer 141 indicates a clip list against which a "drawing unit" (i.e., a drawing command or set of drawing commands) is to be compared, virtual translation/FIFO control unit 200 records the current position in the FIFO command buffer 141 and switches command streams from FIFO command buffer 141 to clip list command buffer 145. Succeeding graphics command fetches for processing by address generator 196 are processed as a memory request similar to that described above but with reference to clip list command buffer 145.

In particular, clip list command buffer 145 is another data structure residing in main memory 140. A clip list command buffer index latch 319 stores the number of clip list buffer positions between the base address of the clip list command buffer and the command of that buffer which is to be read next. A clip list command buffer base register latch 318 holds the base address, i.e., the beginning address of the 64K byte block of memory where the clip list command buffer 145 resides. The translation/FIFO control unit 200 multiplexes/combines the contents of these two latches 318, 319 to generate a request address, and issues a memory request with the generated address, to the memory address and control unit 168. In turn, the memory address and control unit 168 transmits the memory request to main memory (i.e., clip list command buffer 145) via memory data bus 122 and transmits the memory request address on memory address bus 124. The fetched graphics command is returned from clip list command buffer 145 on memory data bus 122 to memory data buffer 169 and the pixel SLU 172 over line 187. Pixel SLU 172 in turn transmits the graphics command to address generator 196 over pixel data bus (PXDAT) 188.

Accordingly, the clip list command stream is an alternative command stream to FIFO command buffer 141. As a result, each pattern or "drawing unit" is placed in the command stream only once, but is caused to be drawn in turn to each clip rectangle specified in the clip list. Thus, a common/same "drawing unit" for multiple clip rectangles of a clip list need only be stored once in the FIFO command buffer 141. Further, drawing commands may also be placed in a clip list of clip list command buffer 145. This allows for a different block of physical or virtual memory (main memory as well as frame buffer locations) to be specified with each clip rectangle in the clip list. As such, drawing to physically or virtually discontiguous blocks of memory can result from the same drawing unit.

Additional features for processing graphics commands through FIFO command buffer 141 and more generally for transmitting graphics commands from processor unit 102 to graphics unit 130 include a residue buffer 324 in pixel SLU 172 and a short circuit logic in virtual translation/FIFO control unit 200. These features are understood to be incorporated in the foregoing operations of address generator 196 during memory reads and writes as detailed in the cofiled Application.

In the preferred embodiment the graphic commands support three basic kinds of drawing operations, namely, raster, text, and line operations. The graphics commands use three operands—SOURCE, DESTINATION, and STENCIL. Different graphics commands involve different combinations of these operands. For a given graphics command, the address generator 196 formulates a virtual or physical memory address for the pertinent operands depending on whether the command includes virtual or physical memory information. The address generator 196 places in latch "Next Address" the formulated memory address and a flag indicating whether the formulated memory address is a virtual or physical memory address. Latch "Next Address" is passed to virtual translation/FIFO control unit 200 for translation into a physical memory address (where the formulated address is a virtual memory address) and for support of subsequent execution of graphics operations.

Figure 6:
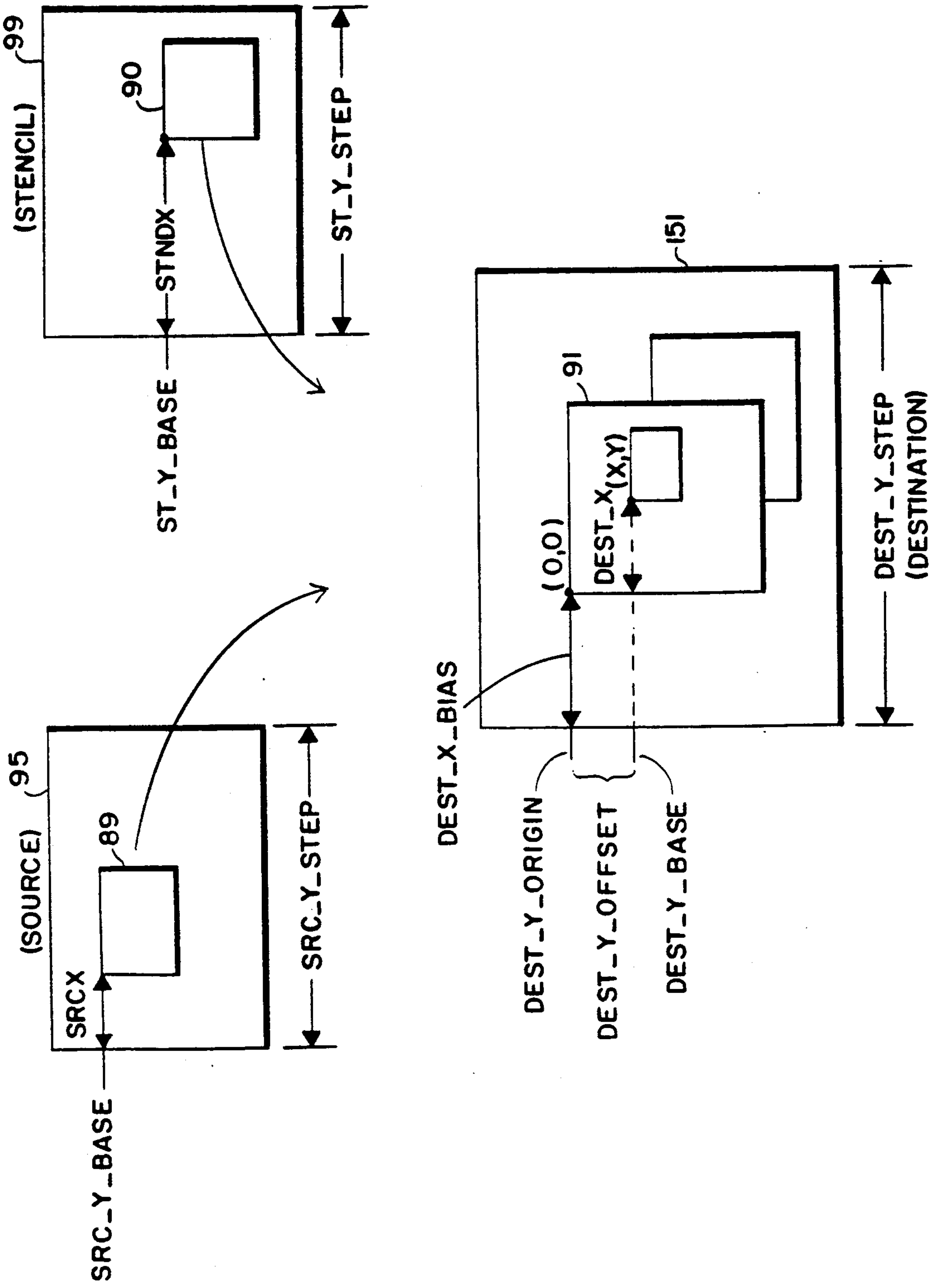
FIG. 6 is a schematic illustration of source, stencil and destination operand spaces on which the graphics control unit of FIG. 2 operates.

The foregoing is accomplished by address generator 196 in the preferred embodiment as follows and illustrated in FIGS. 3A through 3B. As shown in FIG. 6, each operand is specified relative to a respective memory space. Specifically, a desired block of source data 89 resides within a source memory 95. The beginning memory space position of source memory 95 is assumed to be the upper, left-hand corner shown. The desired block of source data 89 has a beginning address denoted (source_X, source_Y_base), where source_X is the distance between the leftmost position of source memory 95 and the leftmost pixel position of source data block 89 along a scanline (horizontal axis). And source_Y_base is the first scanline of source data block 89 within source memory 95. Similarly, a desired block of stencil data 90 resides within a stencil memory 99. The beginning memory space position of stencil memory 99 is assumed to be the upper, left-hand corner shown. The desired block of stencil data 90 has a beginning address of (stencil_X, stencil_Y_base), where stencil_X is the distance between the leftmost position of stencil memory 99 and the leftmost position of stencil data block 90 along a scanline (horizontal axis). And stencil_Y_base is the first scanline of stencil data block 90 within stencil memory 99.

As for the DESTINATION operand, a desired window 91 resides within a destination memory such as frame buffer memory 151. User and client (application) operations involving the window 91, specify positions within the window 91 relative to the upper, left-hand corner (beginning address or origin) of the window instead of the upper, left-hand corner (beginning address) of the destination (frame buffer) memory 151. That is, client/user virtual addresses are based on a coordinate system with an origin at the first window position/address, whereas physical addresses are based on a coordinate system with an origin at the first position/address of destination (frame buffer) memory 151. To that end, window 91 has a beginning address of (DEST_X_bias, DEST_Y_origin), where DEST_X_bias is the distance between the leftmost position of window 91 and the leftmost position of destination (frame buffer) memory 151 along a scanline (horizontal axis). DEST_Y_origin is the byte address of the first scanline of window 91 within destination (frame buffer) memory 151. In turn, a desired position (X,Y) within window 91 is referenced as (DEST_X, DEST_Y_base), where DEST_X is the difference between the pixel position X and the leftmost position in window 91 along a scanline (horizontal axis). DEST_Y_base is the byte address of scanline Y in window 91. The distance or difference between DEST_Y_origin and DEST_Y_base is called DEST_Y_offset and effectively equals the number, in bytes, of destination memory 151 scanlines from the first scanline of window 91 to the scanline of the desired (X,Y) position.

For each operand memory space (source memory 95, stencil memory 99 and destination memory 151), the width of the memory space (i.e., the total number of bytes along the length of a scanline in the memory space) is specified as a Y_step for reasons described below.

Figure 3A:
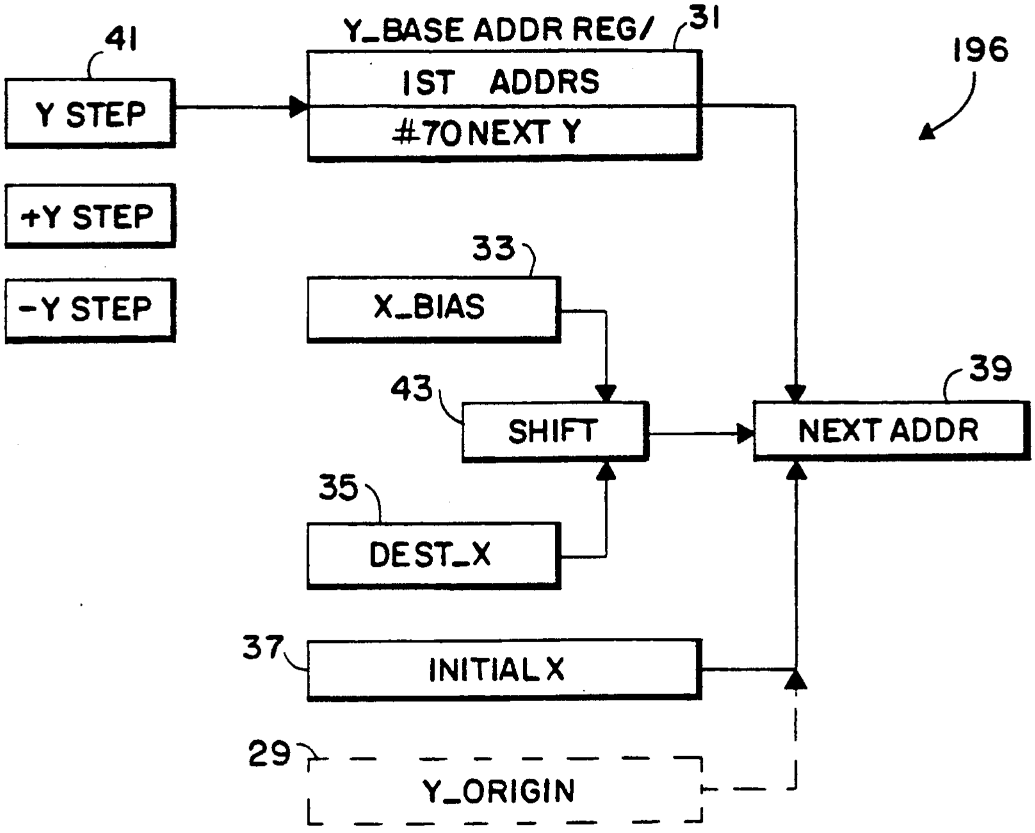
FIGS. 3A and 3B are schematic diagrams of address processing by an address generator employed in the graphics control unit of FIG. 2.

Referring to FIG. 3A, for each operand, address generator 196 employs a Y_Base address register 31, a Y_step register 41, an X_Bias register 33, and an X-position (DEST_X) register 35. The DESTINATION operand also has a Y_origin register 29 shown in broken lines which holds the value of DEST_Y_origin. The Y_Base address register 31 holds the linear long-word address (i.e., the location in main memory 140 or frame buffer 151) that corresponds to the first pixel of the first scanline to be accessed in the operand memory space by the graphics command being processed. This is the address that corresponds to source_Y_base where the operand is SOURCE, stencil_Y_base where the operand is STENCIL, and DEST_Y_base for DESTINATION operands. The Y_Base address register 31 also holds the Y_step value for the operand memory. Preferably, this value is a 14-bit long twos complement number which is initially held in the Y_step register 41 and subsequently added to the Y_Base address register 31. To that end, the Y_step register 41 allows for variable scanline width (Y_step) per operand. Accordingly, the address generator 196 maintains the byte address of the beginning of the current scanline (Y_base) for each of the operands as well as the byte address of scanline 0 for the destination operand (DEST_Y_origin).

The X_Bias register 33 holds the value of DEST_X_bias when the subject operand is DESTINATION; a source_X_bias value when the subject operand is SOURCE; and a stencil_X_bias value when the subject operand is STENCIL. These values (DEST_X_bias, source_X_bias, and stencil_X_bias) are provided to address generator 196 along with Y_base and Y_step values from different graphics commands as made clear later. The source_X_bias value is computationally equal to the value of source_X_minus the value of DEST_X. In a like manner, the stencil_X_bias value equals the value of stencil_X minus the value of DEST_X. As such, source_X_bias and stencil_X_bias are values which when added to the destination X (DEST_X), give the X position in the source and stencil operand spaces, respectively. DEST_X_bias is similarly a value, which, when added to the destination X position (DEST_X), gives the actual X or pixel offset from the beginning of the destination scanline. Preferably, the value held by the X_Bias register 33 is 16 bits long and in twos-complement format.

Accordingly, for all drawing (graphics) commands, address generator 196 states the addresses of operands relative to the Y_Base and X_Bias as follows:

$$\text{operand address} = \text{operand } Y\_\text{base} + \text{DEST}\_X + \text{operand } X\_\text{bias}$$

where "operand" in the above equation is source, stencil or DEST, and each of the values on the right-hand side of the equation are held in respective registers.

In addition at command load time, the following registers are loaded based on an offset value provided in the command plus the contents of the Y_origin register 29:

$$\text{DEST}\_Y\_\text{base} = \text{DEST}\_Y\_\text{origin} + \text{DEST}\_Y\_\text{offset};$$

$$\text{clip}\_Y\_\text{min} = \text{clip}\_Y\_\text{min}\_\text{offset} + \text{DEST}\_Y\_\text{origin};$$

$$\text{clip}\_Y\_\text{max} = \text{clip}\_Y\_\text{max}\_\text{offset} + \text{DEST}\_Y\_\text{origin}$$

where the Y_min_offset and Y_max_offset values are held at register 67 (FIG. 3B) discussed later.

The above enables windows to be moved around memory and the display screen relatively easily. Changes to the base and bias registers 31, 33 are accomplished through setup commands discussed later.

Referring back to FIG. 3A, the X-position or DEST_X register 35 keeps track of the X coordinate (pixel position) within the current scanline of the DESTINATION operand, relative to the left edge of the involved memory window as established by the combination of DEST_X_bias and DEST_Y_base. That is, the DEST_X register 35 is a counter which counts pixel positions starting from the first pixel position of the graphics command. This is accomplished by the DEST_X value. Preferably, the DEST_X register 35 holds this value as a 16-bit, twos-complement number. Further, in the case of graphics commands for certain raster operations, a 16-bit initial X-Position register 37 is used for storing the frame buffer memory location corresponding to the first pixel position needed for each scanline of the raster operation.

In sum, to provide the memory address of an operand read from a graphics command, address generator 196 adds the contents of the X_Bias register 33, the DEST_X register 35, and the Y_Base address register 31. The sum of the contents of the X_Bias register 33 and the DEST_X register 35 provides the current address of the subject operand relative to its Y_Base address. Thus, the addition of the contents of the Y_Base address register 31 provides the memory address of the operand in terms relative to the beginning of the oper- and memory. For monochrome displays, the sum of the contents of the X_Bias register 33 and the DEST_X register 35 are shifted right three bits (as by shifter 43) before being added to the contents of the Y_Base address register 31. This results in formulating the correct byte address. For color displays, the sum of the contents of the X_Bias register 33 and the DEST_X register 35 are not shifted before being added to the contents of the Y_Base address register 31.

Address generator 196 then stores the results of the foregoing addition in a "Next Address" latch 39. Also provided in the "Next Address" latch 39 is a two-bit code for indicating whether the stored address is a physical memory address or a virtual memory address In the preferred embodiment, address generator 196 sets the two-bit code to 00 to indicate that a physical memory address is stored, and sets the two-bit code to 01, 10, or 11 to indicate that the stored address is one of three virtual addresses—DST, SRC, or STL, respectively. (DST refers to Destination; SRC refers to Source; and STL refers to stencil.) The address generator 196 passes the "Next Address" latch 39 to virtual translation/FIFO control unit 200 to effect (execute) the graphics command with the data located at the memory addresses formulated by address generator 196.

In a multi-operand raster operation, corresponding pixels in the respective operands reside at different X coordinates (pixel position within a scanline) in their respective address spaces/memories. Furthermore, the drawables associated with each operand of a graphics command may have different byte or word alignment. Therefore, a mechanism is needed to normalize the operands of a graphics command to a single X address space relative to the memories in which the operands reside.

This is accomplished in the present invention by the pixel bias value provided for each operand in X_Bias register 33. As discussed above, the pixel bias value is defined as the number to add to the current X drawing coordinate (X-position or DEST_X) to find the memory address corresponding to the subject pixel for each operand. The setup commands (discussed later) establish these bias values, taking into account both memory alignment and the difference between the source and destination X coordinate (pixel position) offsets.

For example, in a monochrome operation assume a source operand, SRC, with the following attributes given in hexadecimal values:

Y_Base Address of Pixel 0,0=1000

Bit Offset of Pixel 0,0=05

Y Step=200.

Also assume a destination operand, DEST, with the following attributes:

Y_Base Address of Pixel 0,0=2000

X_Bias Value of Pixel 0,0=01

Y Step=500.

Given the foregoing, to accomplish the following copy command in monochrome:

SRC_X: 100
SRC_Y: 100
DEST_X: 50
DEST_Y: 50
WIDTH: 70
HEIGHT: 80

The registers are loaded as follows:

SRC_Y_Base=1000

SRC_*X*_Bias=SRC_*X*+*SRC bit offset*−*DEST_X*=100+5−50=55

DEST_Y_Origin=2000

DEST_X_Bias=1

SRC Address=(SRC_*X*_Bias+*X* DRAW)<16:3>+SRC_*Y*_Base=(55+5-0)<16:3>+1000

DEST_*Y*_Offset=DEST_*Y* * *Y*_Step=50 * 500=25000

DEST_*Y*_Base=DEST_*Y*_Origin+DEST_*Y*_Offset=2000+25000=27000

DEST Address=(DEST_*X*_Bias+*X* DRAW)<16:3>+DEST_*Y*_BASE=(1+X-DRAW)<16:3>+27000.

The address generator 196 of the present invention supports (i.e., provides addressing for) graphics commands for raster operations to effect graphics drawing primitives (other than vectors), tile and stipple strips, stencils, and glyph bitmaps as follows. With reference to tile and stipple strips, strip implies that the source and destination have the same number of scanlines. Arbitrary sized tiles and strips are supported by address generator 196 and hence graphics control unit 130. The restrictions are that the source must be or expanded to be at least one octaword (16 bytes) in length, and it must be octaword aligned. The tile or stipple can be padded with multiple complete copies. Odd sized tiles and stipples force the destination operand to be accessed twice when the tile or stipple ends and is then read again.

Stipples can either be a contiguous bit stream or a bit-per-pixel bit stream. A Source Plane Index held in register 45 (FIG. 3B) specifies which plane (bit depth) is to be used. Transparent stipples are also supported by graphics control unit 130. The stipple bits which select the foreground and background registers 65, 73 (variables) are routed to a masking logic for selecting the DESTINATION operand whenever the bit is clear. The stipple bits are logically ANDed with a Write Plane Mask 47 and STENCIL operand if enabled. The resulting mask selects between the Pixel SLU 172 and the DESTINATION operand at the bit level for main memory accesses.

Graphics control unit 130 also supports raster operations Span and Continue Span graphics command packets for complex operations. A Span is the raster operation function for a scanline. Trapezoids and tiled or stippled vectors are accomplished with raster operation Span and Continue Span command packets. The Continue Span command packet directs the address generator 196 to update the base address register 31 with the next scanline linear longword address, and supplies a new initial X-position and X count for the DESTINATION operand. The source/stencil operands are specified with each graphics command data packet. The source/stencil operands are already set up before the first raster operation Span packet and are updated for each scanline by the address generator 196. Addressing for each operand is then performed by address generator 196 as described above with reference to FIG. 3A.

Figure 3B:
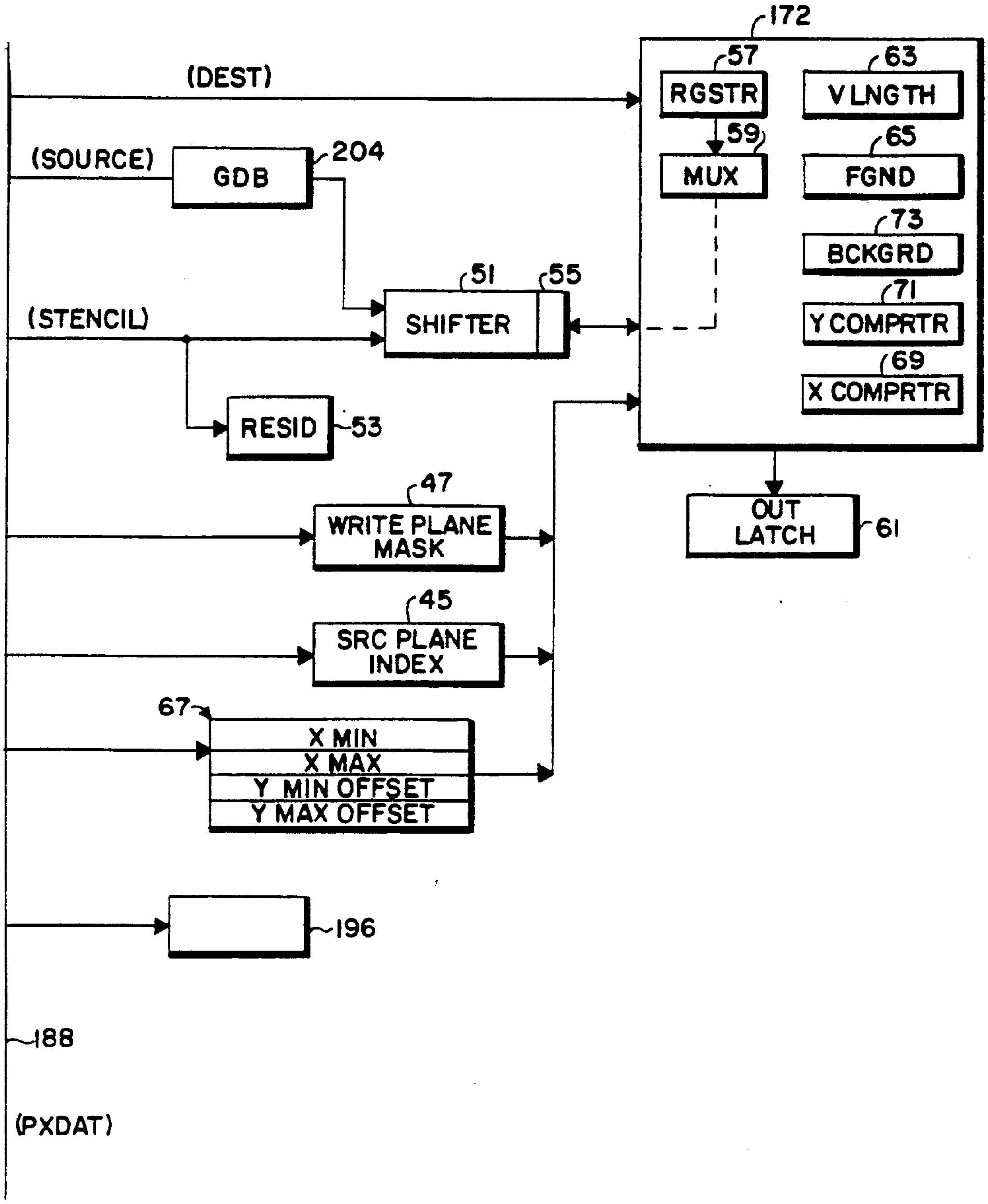

FIG. 3B illustrates address generator support of the foregoing commands in a preferred embodiment. The Write Plane Mask 47 specifies the planes which are to be modified when writing to the DESTINATION operand. The Source Plane Index register 45 specifies the plane (depth bit) of interest for referencing a single plane from a multiplane operand as the source. The input of a funnel shifter 51 is fed by either graphics data buffer 204 or the STENCIL operand. The STENCIL operand has a one longword residue latch 53 before funnel shifter 51 and one mask buffer 55 at output of the funnel shifter 51. The STENCIL operand is fed through the funnel shifter 51 for aligning with the DESTINATION operand. A quadword (64 bits) is required to result in a longword of STENCIL for masking. When used for color, four bits are used for each longword and sixteen bits for an octaword. A longword of the STENCIL operand is fetched every two DESTINATION accesses for color pixels.

When the DESTINATION is a contiguous single plane operand, i.e., a monochrome bit map, then the destination accesses are limited to a single longword (32 pixels); and a longword of the STENCIL operand is fetched between every destination access.

Address generator 196 requests an octaword (128 bits) for the Source data and loads it into the graphics data buffer 204 through PXDAT line 188. When the data is read from main memory 140, the data is checked for correct parity and corrected. The contents of graphics data buffer 204 are funnel-shifted down to sixteen bits in preparation of processing in pixel SLU 172 with the destination data. The first access on a scanline accesses two octawords to ensure the presence of the correct amount of data for one octaword destination access. If source and destination are perfectly aligned, then one octaword is accessed. At any event, octawords are accessed for pipe line processing through GDB 204 and SLU 172.

The shift amount in the funnel shifter 51 is determined by the SOURCE address, Source Plane Index, and DESTINATION address. The beginning of the source data must be aligned with the beginning of the destination. The source must also be wrapped when it is smaller than the destination. The X dimension (pixel position) is wrapped for tiles and stipples. The wrapping occurs by reading the source a second time and performing two operations on the same destination data with the appropriate masking applied.

Funnel shifter 51 is basically a multiplexer. To that end, funnel shifting is accomplished by multiplexing the output of graphics data buffer 204 and selecting the appropriate byte from each longword. The first stage of the funnel shifter 51 shuffles the bytes to the appropriate position for the bit shifter which follows. The bytes are shuffled for both right-to-left and left-to-right shifting. The bit shifter shifts from left to right 0 to 7 bits. This works for both monochrome and 8-plane color. It also allows planes to be moved.

The pixel SLU 172 is a 32-bit wide logic unit. Data is pipelined, and control is clocked every one-half cycle for providing an effective throughput of one longword every cycle.

The address generator 196 requests a destination octaword (128 bits) read-modify-write or just a write, depending on the Boolean function and the destination (main memory 140 or frame buffer 151. The memory data input of pixel SLU 172 receives the destination data into register 57. A 16-bit, 4-to-1 multiplexer 59 for selecting the appropriate word receives from register 57 the destination data. The multiplexer 59 feeds both the Pixel SLU 172 and the funnel shifter 51. The Pixel SLU 172 makes two passes at the data with shifting both the source and destination data and writing a word into the 32-bit output latch 61. The output latch 61 is two longword latches which act as a double-buffered longword latch.

The masking operation to frame buffer 151 of the written data is taken care of with write plane mask registers 47. The write mask register 47 contains a byte mask for internal bytes and begin and end bytes for the byte boundaries for both edges of the raster operation. The boundary bytes are generated with the instruction of the address generator 196 which contains the address and pixel count. When a third (STENCIL) operand is used, the third operand is logically ANDed with the plane mask 47 for generating the correct mask with write-only operations. This only works for longword accesses. Accesses which are larger than a longword and have edge masks are performed with read-modify-write operations. When a read-modify-write operation is in process, then the ANDed mask becomes the multiplexer select between the pixel SLU 172 and the destination data. De-asserted bits select the destination data. Raster operations to main memory 140 perform read-modify-writes for performing the plane masking.

Scrolling and window moves are accomplished by using two operand raster operation command packets. A typical case described here is a two-operand raster operation which requires both the Source and Destination command packets. Other cases involving source and destination command packets are understood to be similarly handled. No special case data packets are supported, since all operations can be either to the display screen or to virtual memory as well as physical memory. Operand addressing by address generator 196 is as described above. The registers used in the preferred embodiment are DST and SRC Y_Base registers 31, DST and SRC Y_step registers 41, DEST_X register 35, initial X-Position register 37, DST and SRC X_Bias register 33, DST X count, Initial X count and Y count.

The data moves to and from graphics data buffer 204 with octaword accesses. Data moves through the Source path of the Pixel SLU 172. As the data is moved, it is shifted, inverted, or left alone. The plane mask 47 is used on writes to the frame buffer 151 with write octawords, and octaword read-modify-writes with the plane mask 47 is used to main memory 140.

Two modes are supported for text, transparent (masked) and opaque (unmasked). If transparent text is desired, then all de-asserted bits disable the writing of the appropriate pixels. The asserted bits are written with the foreground color for color displays. The mask logic takes care of the disabling of the writes. The font is loaded into the third operand of the raster operation data packet. This operand is logically ANDed with the plane mask 47 and selected on a bit basis with the destination operand or the Pixel SLU 172. This is performed for both one and eight bits per pixel, i.e., pixel depths of one bit and eight bits. When opaque characters are used, then the bit selects between two colors, foreground or background, for color displays. This functionally resides within the Pixel SLU 172. Also, any glyph data is loaded into the SOURCE operand. Unlike any other source, the scanlines of the glyph can be of a arbitrary width in bits. Tiled text is supported by first rendering the text to a temporary bitmap, and subsequently using the result as an input to the STENCIL operand, while supplying a tile pixmap to the SOURCE operand.

The text source data is read from either main memory 140 or frame buffer 151. It is passed through the Pixel SLU 172 and stored into an octaword block data buffer. The octaword data buffer 204 then presents the appropriate bytes to the funnel shifter 51 which provides the shifting down to two bits for the color selection. The text can be a linear source operand and a different or the same shape as the destination memory space. The X_Bias registers and X-position counter (DEST_X) are used as described above.

Rectangle fill is accomplished with either one, two, or three operand raster operations depending on whether the fill is solid, tiled, stippled, stenciled, and/or a combination of tiled, stenciled, stippled, and copy. The description below describes the flow for this particular application of graphic control unit 130. Solid colored or stippled rectangle fills are accomplished by unloading the graphic data buffer 204 with an arbitrary pattern and number of bits from either the host or main memory. The data buffer 204 acts as the source for filling a rectangular portion of either frame buffer 151 or main memory 140. The fill pattern wraps back on itself on a scanline-by-scanline basis. The data is either used directly, color expanded, or as both the source and mask for transparency.

Vector or line drawing is supported by graphics control unit 130 using a modified Bresenham scheme. The registers used for formulating operand addresses described above in FIG. 3A of the address generator 196 are utilized for vector drawing but with different contents. Three 16-bit registers of FIG. 3A are required for error calculations in vector drawing which direct the X and Y_steps for drawing the desired line. In particular, the Stencil X_Bias register 33 is used as an error accumulation register. The initial X-Position register 37 is used as a primary error register, and the Stencil Y_step register 41 is used as a secondary error register.

In one embodiment of the present invention, the Source addressing registers are used for addressing a linear operand for patterned (dashed and dot) vectors/-lines. The Source operand may be color-expanded if desired. Two-dimensional tiled and stippled vectors are not supported here. Three-operand vectors are also not supported in vector/line drawing by graphics control unit 130. In another embodiment, tiled, dashed and stenciled lines are drawn one pixel at a time.

The positive and negative Y_step registers (FIG. 3A) are loaded with 14-bit twos-complement Y-scanline steps. The positive or negative Y_step register is sign extended and added to the destination Y_Base address register 31 dependent on the error accumulator register's (Stencil X_Bias register's) most significant bit.

The X-position count or DEST_X register 35 is loaded with the starting X pixel coordinate relative to the window or pixel map. The DEST_X register 35 is added to the positive access size, negative access size in pixels (1 or −1 or 0), and updated in parallel with the forming of the new Destination Y_Base address register 31. That is, the X-position count (DEST_X register) 35 is incremented, decremented, or remains unchanged, depending on the octant of the vector being drawn and the most significant bit of the error accumulator register (Stencil X_Bias register 33). The incrementing/decrementing depends on the setting of an X_backward (Y_backward) bit in the graphics commands described later.

The contents of the Next Address latch 39 is the latched sum of the DEST_X register 35, operand X_Bias register 33, and the operand Y_Base address register 31 as described above.

The error accumulator register's (Stencil X_Bias register's) most significant bit also selects between the 16-bit, twos-complement contents of primary error and secondary error registers (initial X-Position register 37 and Stencil Y_step register 41), respectively.

The operand addressing is pipelined for enabling the calculation of the next address, check for last pixel, window clip, and virtual address comparison, to occur in parallel with the addressing of the present pixel. The pixel size is within an address generator control register for helping the graphics control unit 130 determine the number of bytes which must be read and written. The DEST_X (X-Position) and X_Bias registers 35, 33 provide an address to either the bit for monochrome or byte for eight-plane color, respectively.

For zero-length vectors, graphics control unit 130 draws no points on the Destination space (i.e., main memory or screen view of display device 116). Vectors of length 1 are drawn with one pixel and no registers other than the destination base address register 31, X-Position register 35, and the vector length counter 63 need to be loaded. Typically, the data for flat-shaded vectors is supplied to the Pixel SLU's 172 foreground latch 65 with the pertinent logical function.

The address generator 196 supports window-clipping rectangles. The window-clipping rectangle functionality is usable for graphics commands to both the frame buffer 151 and main memory 140. In a preferred embodiment of address generator 196, there are four clipping rectangle registers, X minimum, Y minimum offset and X maximum, Y maximum offset illustrated at 67 in FIG. 3B. Y_offsets are used to enable implementation of multiplication without a multiplier device. More importantly, Y_offsets are used so that the actual drawing commands are unbound from the location of the destination memory. Therefore, the destination memory origin can be reloaded via a clip list, but the same set of drawing commands can be executed to multiple destination operands.

The window clipping rectangle is loaded with the linear longword addresses for the Y coordinate for the upper and lower left corner of the destination window, screen, or pixel map. The Y registers are compared to Y comparator 71, the Y registers and comparator preferably being 28 bits each. The X values are relative to these longword addresses. The X registers and comparator 69 are preferably 16 bits each.

Two comparators 69, 71 are used twice per destination access which check for four edges of the rectangle. Writing occurs when the address is within the rectangle as determined from the X, Y minimum and X, Y maximum established from registers at 67. The X comparator 69 checks multiple pixels at a time, e.g., 16 for 8 plane and 32 for monochrome. This means that monochrome or continuous single-plane operations are performed one longword (32 pixels) at a time, while color is operated on an octaword (16 pixels) at a time.

Accordingly, clipping is executed such that a series of single scanline operations (i.e. points or spans) result in the same series of Y addresses, regardless of the location of the clip rectangle.

Now turning to the command set of the present invention. The command set is optimized to support low-level software drawing algorithms efficiently, as discussed next. In order to allow low-level graphics software algorithms to operate efficiently, the present invention command set has the following characteristics:

(1) very small packets for point, pixel, and span commands. This presents the same or less cost for drawing individual pixels as a "dumb" color frame buffer.

(2) Y-update modifier, for supporting "stepping" or not "stepping" in the Y (scanline) direction for Bresenham or other algorithms across all operands.

(3) X-update modifier, for supporting "stepping" or not "stepping" in X (pixel position) direction for Bresenham algorithms.

(4) No-draw modifier, for supporting updating internal addresses without drawing. Used in dash algorithms.

(5) Y-backwards modifier, for causing all internal Y-addresses to be decremented instead of incremented.

(6) X-backwards modifier, for causing internal X-addresses to be decremented instead of incremented.

(7) DEST-relative addressing (destination-relative addressing). That is, address generator 196 computes the X address of the SOURCE and STENCIL operands automatically using the DESTINATION address X, as previously detailed.

(8) Preservation of internal state for:

(a) current destination scanline (b) current destination pixel position X (c) current source scanline (d) current stencil scanline (e) current source X-bias (f) current stencil X-bias Preservation of this state is accomplished by registers in FIGS. 3A, 3B holding respective values until modified by pertinent graphics commands. By retaining this state, the present invention makes it unnecessary for this information to be respecified in graphics commands for a trivial draw operation. For example, it is possible to draw a stenciled, tiled circle by supplying a stream of [X,width] pairs.

(9) FG/BG modifier, for allowing selection of the foreground or background color of a display without explicitly reloading a color.

(10) Ability to modify foreground and background colors as part of a pixel drawing command. This supports continuous tone operations, where a sequence of adjacent pixels all have different values generated by the algorithm.

(11) Short-circuit FIFO support. This eliminates FIFO memory traffic overhead which is significant relative to the drawing memory traffic for these trivial operations.

With regard to another aspect of the present invention, the Destination operand address and other contextual information supporting a graphics command are established independently and separately from the actual desired operation. To that end, for a sequence of graphics commands with a common context, the context only needs to be specified one time for the sequence instead of one time for each graphics command in the sequence. Further, the contextual information of a desired graphics command is organized in independent parts for allocating foreground color, background color, plane mask, logic unit function, destination/clip rectangle (or alternatively clip list) and desired operation (in single plane or multiplane). To that end, each independent part may be changed individually while retaining previous allocations for the other parts such that only the changed part is respecified within a sequence of graphics commands.

Said another way, frequently sequences of graphics commands consist of operations that are repetitive and in which the context of the command varies in a repetitive or easily calculated way from the context of the previous command, or does not vary at all. Some graphics systems recognize this fact by having graphics context commands. However, each graphics command updates many elements of graphics context that do not need updating. The present invention provides setup graphics commands (distinct from raster drawing/operation graphics commands) that are of finer granularity than that in the prior art (and in particular than that in packet-based interfaces), such that updating occurs only to elements that have changed.

More generally, in graphics commands, it is frequently not necessary to send all the fields of a command. The information contained in some of the command fields may be redundant, or not necessary. Since sending this information generates bus traffic, it is desirable to send only necessary information over the bus. The present invention accomplishes this by enabling each graphics command to have one length when transmitted a first time and thereafter a potentially shorter length when transmitted a subsequent time within a common series or sequence of graphics commands. In particular, the format of the graphics commands includes multiple fields arranged in the same order from one command to the next. The values of certain fields of the graphics commands are held in respective memory registers, unchanged until respecified in subsequent graphics commands. Those fields are positioned in an omittable end portion of the graphic command (i.e., in a last valid word, byte, or other logical unit of the graphics command). In the preferred embodiment the order of these fields is organized so that the most frequently used fields are near the beginning of the command format. Each of the possible fields of a graphics command of the present invention is detailed next with reference to FIGS. 5A through 5R.

Figure 5A:
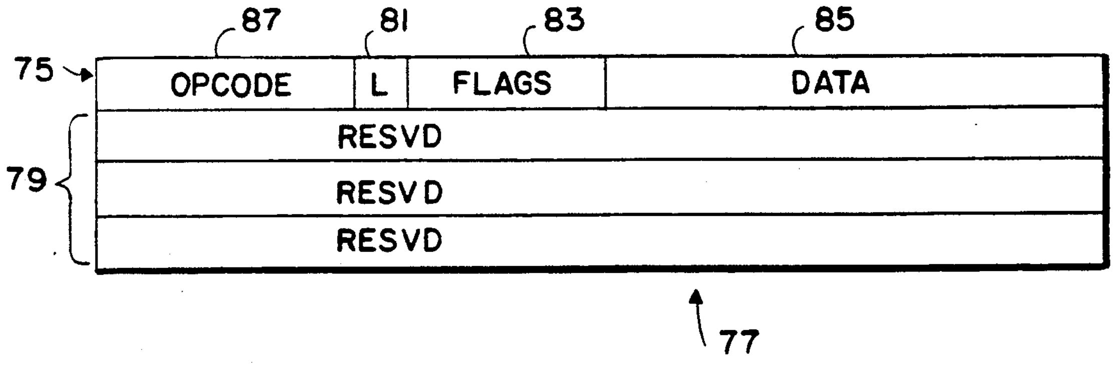
FIGS. 5A through 5R are schematic illustrations of graphics commands which form the command set employed in the computer graphics system of FIG. 1.

The general graphics command 77 format is illustrated in FIG. 5A with a header 75 as the first longword (32 bits) and three succeeding longwords 77 reserved for data dependent on the graphics command specified in the header. The first eight bits of the header 75 are allocated for operation codes 87. The succeeding two bits form a length field 81 which encodes the number of longwords which succeed the header and carry valid information. A six-bit flag field 83 includes (i) operation-dependent flags that are generally examined by the address generator 196 in specific data flows relating to the operation code 87 and operation set-up "action" flags, described later, and (ii) FIFO command buffer 141 flags used to implement clip list processing. The latter flags are provided for most graphics commands which are expected to occur in the clip list and for those that begin or end a "draw unit" (discussed later) in the FIFO command buffer 141. Further, the FIFO control flags are handled directly by the FIFO command buffer logic in virtual translation/FIFO control unit 200. When these bits 83 are not used for FIFO control flags, they are available as additional flags (e.g. halt, interrupt and wait/synchronization flags) to the address generator 196. The last sixteen bits of header 75 provide operation-code-dependent data 85.

Figure 5B:
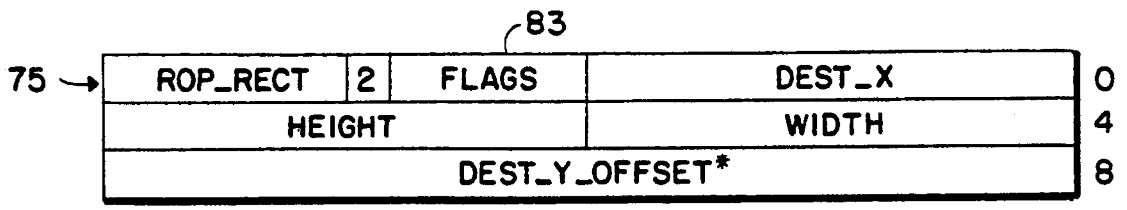
Figure 5C:
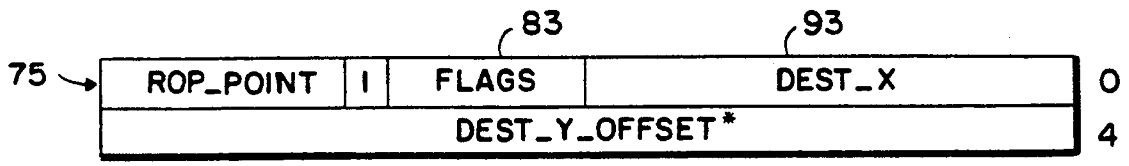
Figure 5D:
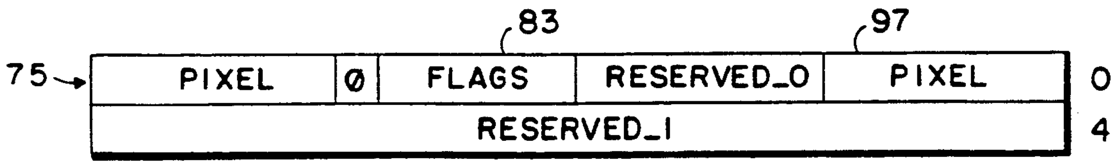

FIGS. 5B through 5D illustrate graphics commands for raster or drawing operations of particular interest, namely ROP_RECT, ROP_POINT and PIXEL. The ROP_RECT command is used to draw an arbitrary rectangle to either physical, virtual memory or to I/O space. The ROP_POINT and PIXEL commands perform identically to ROP_RECT except in only drawing a single pixel or point.

FIG. 5B illustrates the graphics command format for the ROP_RECT graphics command. This graphics command starts a raster operation for a rectangle, strip, or span. This command is also used for one-, two-, and three-operand raster operations as well as tile and stipple operations. The operation that is performed depends upon the value of the action field in an associated OP_SETUP command set forth later.

The command format illustrated in FIG. 5B shows the operation code ROP_RECT in the most significant eight bits of header 75. The length bit indicates that two additional longwords follow the header 75 for this command. A Y_backward flag if set in flag field 89 causes respective Y-step values to be subtracted rather than added to the scanline addresses for each operand. This causes the raster operation to progress from bottom to top rather than the usual top to bottom of the operand memory spaces. An X_backward flag if set in field 83 enables copy to move from right to left across each scanline. In a copy operation, the X_backward flag only needs to be set if the source and destination share the same starting scanline and the source is to the left of (smaller x) the destination.

It is sometimes convenient to draw twice on the same scanline. The Y_NO_UPDATE flag is used for this purpose. When this flag is clear (not set), the SCANLINE ADDRESSES for each of the operands is updated by the Y-step associated with that operand. Preferably, the Y_NO_UPDATE flag is used with point or span algorithms when the subsequent draw operation is to occur at the same Y coordinate. Without this flag, it would be necessary for the software to shadow SCANLINE ADDRESSES for each operand and re-execute operand setup commands every time it was necessary to suspend progression in Y.

Flag field 89 also holds clip control codes described later.

The least-most significant 16 bits of the header 75 store the destination X at which the rectangle should be drawn, i.e., the X coordinate, in the destination coordinate space, of the first pixel in the destination to be modified. This field (DEST_X) is undefined after most raster operations.

In the longword that succeeds the header 75, width (the number of pixels in X that should be filled) and height (the number of pixels in Y that should be filled) information are provided. In the third longword of the ROP_RECT command format, an offset value is stored. The offset, in bytes, is defined as the distance between the SCANLINE ADDRESS of the first scanline to be drawn and the origin of the destination supplied in the DEST_SETUP command packet. The address generator 196 calculates the initial DESTINATION SCANLINE ADDRESS as (DEST_Y_OFFSET+DEST_Y_ORIGIN) prior to executing the raster operation. This offset is used instead of an address so that the same sequence of clip entries can be executed against multiple destination memories.

Algorithms which output sequential spans can be implemented with the two longword variant of the ROP_RECT command illustrated in FIG. 5B. At the end of each ROP_RECT command, all three of the active operand SCANLINE ADDRESSES are updated internally by graphics control unit 130. The starting SCANLINE ADDRESSES need only be established once at the beginning of the series of vertically adjacent spans. Each additional span requires only the X-Position, width, and height=1. However, span and point algorithms which rely on internal SCANLINE ADDRESSES must take care that the starting SCANLINE ADDRESSES are re-established once per sequence of commands (called a drawing unit discussed later) as the entire sequence of commands on the clip unit is re-executed (as discussed later).

The ROP_RECT command has the following relationship to SOURCE and STENCIL operands. If SOURCE and/or STENCIL operands are in use, the new SCANLINE ADDRESSES for these operands must be established prior to any raster operation data packet which includes a DEST_Y offset. This is required to set the corresponding SCANLINE ADDRESSES. The source setup command packet must reset the tile, pixmap, SCANLINE ADDRESS once every tile height scanline in one embodiment of the present invention.

Illustrated in FIG. 5C is the command format for the ROP_POINT graphics command. The ROP_POINT graphics command executes the same function as ROP_RECT, except that height and width are assumed to be 1 and do not have to be passed explicitly. It is intended for use by software algorithms which emit points of the same color. Each pixel drawn typically requires a single longword written to the FIFO command buffer 141. Software retains control of address generation but can exploit the shifter 51, Pixel SLU 172, and some of the internal adders to advantage. Examples of algorithms which may be rendered with this command are tiled, stippled, stenciled, and dash lines and arcs.

Referring to FIG. 5C, the header 75 provides an eight-bit operation code indicating the ROP_POINT command. The header also provides six flags in flag field 83 as follows:

A NO_DRAW flag, when set, inhibits destination modification but does not affect internal scanline address updates. The NO_DRAW flag is intended for use in drawing on/off or dashed lines where alternate segments of the dashed lines pattern are not to be modified. Executing a ROP_POINT command with the NO_DRAW flag asserted accomplishes the SCANLINE ADDRESS updates on up to three operands.

An X_UPDATE flag, when set, causes the DEST X field 93 to be incremented or decremented by one after the draw operation;

A USE_BG flag, when set, draws with the background pixel value instead of the foreground pixel value; and The X_backward, Y_backward and Y_no_update flags as described in FIG. 5B. That is, the Y_NO_UPDATE flag allows drawing more than one pixel to a scanline. The Y_NO_UPDATE and X_UPDATE flags result in the orderly update of the destination X and the destination Y offset registers so that lines and arcs can be optimized for command bandwidth.

The length field of the header indicates that, at most, only one longword follows the header 75. In that succeeding longword is the Y destination offset in bytes, similar to that described in FIG. 5B.

The ROP_POINT graphics command allows the address generator logic to concentrate on the destination address generation. The combination of normal CPU write buffering and the FIFO command buffer 141 allow the CPU to queue ROP_POINT and PIXEL commands without waiting on memory. The applications of ROP_POINT, and PIXEL commands could also be implemented by accessing the frame buffer 151 directly. However, direct frame-buffer access has the following disadvantages.

(1) need to synchronize with previously queued drawing commands;

(2) need to stall CPU to wait for frame buffer reads and writes;

(3) complexity of managing tile and stencil operands; and (4) need to handle clipping in software instead of through clip list buffer 145.

FIG. 5D illustrates the PIXEL command format. The PIXEL graphics command is likewise similar to the ROP_RECT command except in the area of data packet loading. The PIXEL command has only one parameter. That parameter is a pixel color value which is loaded into either the foreground or background registers 65, 73 (FIG. 3B). The destination X and Y values are assumed to still be valid from the last command executed. To that end, the PIXEL command is for scanline algorithms which emit pixel values as they move across a scanline.

Referring to FIG. 5D, the most significant eight bits of the header 75 of the PIXEL command indicates the PIXEL command operation code. The flags field 83 includes the NO_DRAW, X_update, USE_BG, Y_backward, X_backward, and Y_NO_UPDATE flags described above. The length field indicates that one longword follows the header. The least significant 16 bits of the header 75 contains a pixel value to load into the foreground or background register 65, 73 (FIG. 3B) prior to drawing when the NO_DRAW flag is set. For eight-plane destinations, this is simply an eight-bit pixel value. For one-plane (monochrome) destinations, the foreground/background registers 65, 73 are interpreted as eight adjacent pixels. Therefore, the bit representing the foreground or background pixel values is replicated eight times. That is, for one-plane destinations, the pixel field 97 contents is 0XFF (foreground) or 0X00 (background).

The functionality of the pixel command may be accomplished with direct frame-buffer access from the CPU. However, this requires synchronization with previously queued commands, software clipping, stenciling and combinatorial logic, and makes poor use of the memory data paths. Using the pixel command is therefore preferred over direct frame-buffer access.

It is noted that another graphics command must be used to establish the location of the beginning of a desired scanline. This is accomplished in a non-redundant way by using the ROP_POINT command in its two longword form specifying DEST_X and DEST_Y_OFFSET only. Subsequent pixels require one single longword pixel command each. In addition, pixels may be skipped either by insertion of a one longword ROP_POINT command or by a PIXEL command with the NO_DRAW flag bit asserted.

Figure 5E:
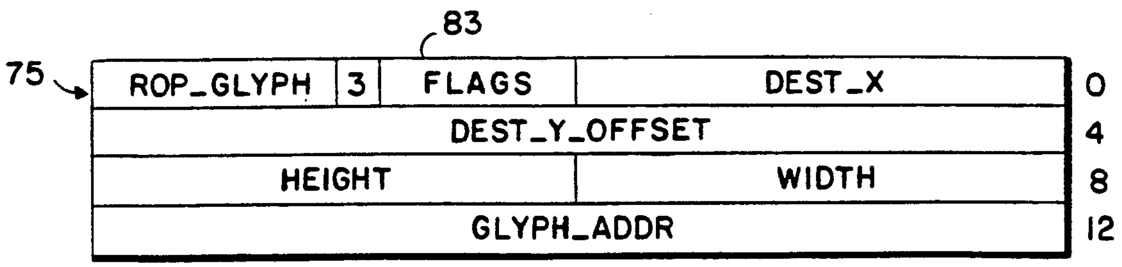
Figure 5F:
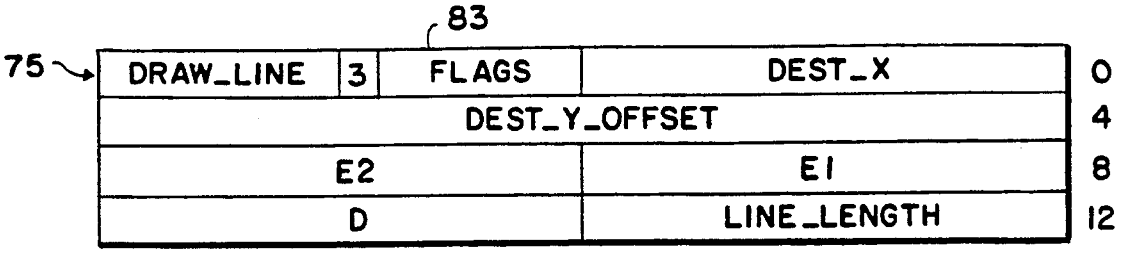

Additional raster drawing operations use glyph primitives and line primitives discussed in FIGS. 5E and 5F. FIG. 5E illustrates a command format for a ROP_GLYPH command. The ROP_GLYPH command is a specialized variant of the ROP_RECT command which fetches glyph bit maps in an optimal way. The present invention graphics system glyph bit maps are like other bit maps except that there is no interscanline padding. The dimensions of the glyph bit map are the minimum bounding rectangle for the inked area of the glyph. Direct support for packed glyph bit maps allows the graphics system of the present invention, in most cases, to read the entire glyph bit map in a single octaword read. Total memory traffic is nearly halved over a discrete read for each source scanline of the glyph. No direct support is supplied for image text. It is generally more efficient for the present invention graphics system to clear a whole line of text at once than to clear a single glyph. At the expense of some generality, the overall command format is defined such that no source setup command is required for rendering glyphs. This, in turn, reduces CPU load and FIFO buffer traffic.

Referring to FIG. 5E, the header 75 contains an eight bit operation code indicating the ROP_GLYPH command. A VIRTUAL flag 83, when set, indicates that the glyph address is a virtual address. Other flags include clip control codes in flag field 83 as discussed later. The length field in the header 75 indicates that three longwords follow the header 75 in the ROP_GLYPH command. The DEST_X field (least significant 16 bits) of the header 75 provides the X coordinate in the destination coordinate space of the first pixel in the destination to be written. The longword following the header 75 provides the Y_OFFSET, in bytes, in the field indicated DEST_Y_OFFSET. The third longword of the ROP_GLYPH command has a height field and a width field. The height field provides an indication of height (in pixels) of the glyph as it will be drawn to the destination. The width field provides a width value (in pixels) of the glyph as it will be drawn to the destination. The width of the destination write is tied to the width of the glyph pix map. This, in combination with the bit map address, eliminates the need to supply a separate source setup packet. The fourth longword of the ROP_GLYPH command provides the byte address of the glyph bit map in the field marked GLYPH_ADDR.

FIG. 5F provides the graphics command format for the DRAW_LINE command. This command draws a thin, solid vector. The line primitive implements the Bresenham line drawing algorithm to give vector drawing rates that approach memory speed.

The header 75 of the DRAW_LINE command provides an operation code (DRAW_LINE) in the leftmost field and an X coordinate in the destination coordinate space in the DEST_X field. The flags field 83 provides a Y_backward flag, an X_backward flag, and a Y_major flag among clip control codes (discussed later). The Y_backward flag, when set, indicates that the starting Y coordinate of the line is greater than the ending Y coordinate. The X-backward flag, when set, indicates that the starting X coordinate of the line is greater than the ending X coordinate. The Y_major flag, when set, indicates that the line spans more pixels in Y than in X. The length field indicates that the command format contains a total of four longwords (three longwords succeeding the header 75).

The second longword carries the Y offset in bytes. The third longword is formed of two fields, an e2 field and an e1 field. The e1 field indicates the increment to be added to a variable D when moving along the major axis. The e2 field provides the increment to be added to the variable D when moving along the minor axis. The value of the variable D is held in a first field of the fourth longword of the command. The variable D is an unsigned, 16-bit integer which overflows when it is time to move in the minor axis. A line length field is also provided in the last longword of the command. The line length field provides the number of pixels to draw.

Figure 5G:
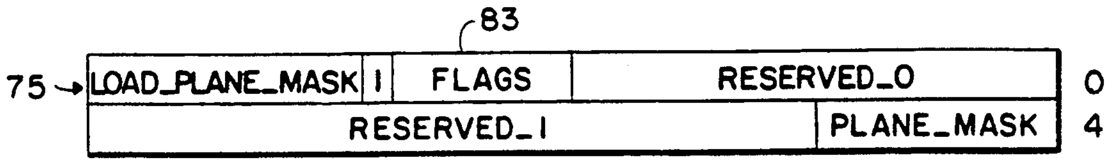
Figure 5H:
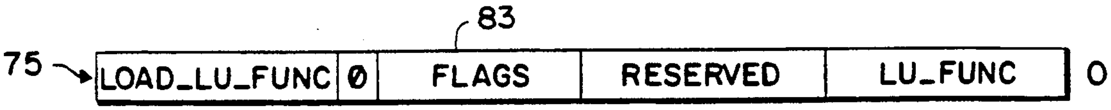
Figure 5I:
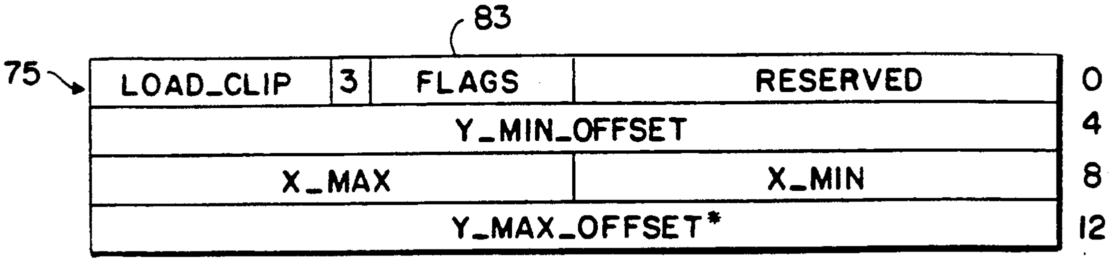
Figure 5J:
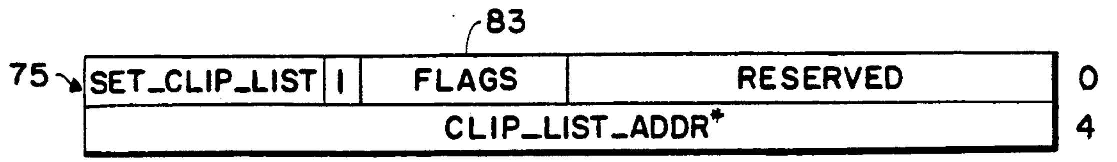
Figure 5K:
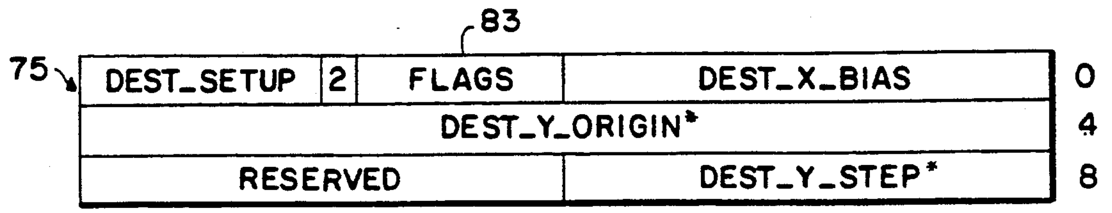

In addition to the raster operation commands, data packets of the present invention graphics system also include setup commands discussed next with reference to FIGS. 5G through 5K. It is these commands that provide setup and allocation operations used in forming the "context" for supporting the foregoing drawing graphics command or sequence of such graphics commands. The context includes "graphics context" and "clip context" parts. The PIXEL, LOAD_PLANE_MASK, and LOAD_LU_FUNC commands of FIGS. 5D, 5G, and 5H provide "graphics context" operations, and DEST_SETUP and LOAD_CLIP (or SET_CLIP LIST) commands of FIGS. 5I through 5K provide "clip context" operations. The OP_SETUP, SOURCE_SETUP, and STENCIL_SETUP commands of FIGS. 5L through 5N establish the desired operation to be performed and the source and stencil for carrying out that operation. Each of the foregoing context commands of FIGS. 5D and 5G through 5N are independent from each other so that individual ones of these commands may be changed independent of the others. Accordingly, the context may be maintained as a whole independent of the raster or drawing operation or series of such operations, and may be changed in individual aspects retaining the other aspects from previous allocations.

FIG. 5G illustrates the LOAD_PLANE_MASK command format. The LOAD_PLANE_MASK command is used to indicate the writeable planes for all subsequent operations until the next LOAD_PLANE_MASK operation. The header of the LOAD_PLANE_MASK command provides in the most significant bits an indication of the operation code for the LOAD_PLANE_MASK command. The length field of the header indicates that one longword follows the header. The desired PLANE_MASK is held in that longword. The PLANE_MASK is a bit mask representing which destination planes are to be modified. When used with a one-plane destination, the bits in the PLANE_MASK field correspond to adjacent pixels. Therefore, the PLANE_MASK is set to all ones for use with a one-plane destination.

FIG. 5H illustrates the format for the LOAD_LU_FUNC command. This command sets the logical unit function for subsequent operations. The logical unit function controls which boolean operation will be performed between the SOURCE and DESTINATION data.

The SOURCE data presented to the Pixel SLU 172 depends on (i) the data fetched into the GDB 204 (FIG. 2) and (ii) the interpretation of that data. The data fetched into the GDB 204 is controlled by the OP_SETUP command ACTION field 27 (described later in FIG. 5N). For ACTION field 27 values of MULTI_xxx or EXTRACT_xxx, 8-bits per destination pixel are fetched. For ACTION field 27 values of EXPAND_xxx or MONO_xxx, 1-bit per destination pixel is fetched. Data interpretation is then controlled by the USE_GDB and PIXEL_EXPAND flags, as well as the OP_SETUP command ACTION field 27 value, as follows.

For USE_GDB=0, data held in GDB 204 is ignored. Either the foreground or background color register 65, 73 is used depending on the most recent value of the USE_BG flag. For USE_GDB=1, data held in GDB 204 is used whether or not data is being fetched into the GDB 204. For PIXEL_EXPAND=0, data held in GDB 204 is passed straight through to the Pixel SLU 172. For PIXEL_EXPAND=1, data from GDB 204 is interpreted as 1-bit per pixel. If the bit is one, the contents of the foreground color register 65 are presented to the SLU 172.

Accordingly, in a preferred embodiment the SOURCE data presented to the PIXEL SLU 172 is originated in one of three ways:

1. FILL operations.

In this case, the source data is always the value of the foreground register 65.

2. EXPAND operations.

In these operations, a single plane of source data is expanded before being presented to the SLU 172. Each 1-bit of source data is replaced with the foreground register value and each 0-bit of source data is replaced with the background register value.

It is also possible to accomplish color substitution when both the source and destination operands are 1 plane. This is done by selecting the OP_SETUP command PIXEL_EXPAND flag in conjunction with the appropriate OP_SETUP command ACTION field value. When used in this way, the foreground and background registers 65, 73 values represent 8 adjacent pixels each. The monochrome pixel value should be replicated 8 times.

Use of the PIXEL_EXPAND flag in the OP_SETUP command to monochrome (1-bit) destinations is one feature that makes the depth of the destination transparent to the lowest level rendering routines.

A stipple operation is another form of an expand operation. The SOURCE operand is used for the STIPPLE data.

3. MULTI-PLANE SOURCE

If the OP_SETUP command ACTION flag is MULTI_xxxx, then the source data is passed through directly to the SLU 172.

FIG. 5I illustrates the command format for the LOAD_CLIP command. The LOAD_CLIP command loads the working registers 67 (FIG. 3B) which define the current clip rectangle. The clip list command buffer 145 consists of a sequence of LOAD_CLIP commands. The header 75 of the LOAD_CLIP command is formed of an operation code field, a flags field 83, and a length field. The operation code field indicates the LOAD_CLIP command. The flags in the flag field include an "end clip unit" (end CU) flag and an "end clip list" (end CL) flag. The former flag transfers the command stream back to the FIFO command buffer 141, and marks the last command packet in a clip unit. A clip unit is the set of commands required to establish a new clip rectangle. Typically, a clip unit consists of either a LOAD_CLIP command by itself or a DEST_SETUP command followed by a LOAD_CLIP command.

The "end clip list" flag indicates the last clip rectangle specified in the clip list command stream (i.e., the end of the clip list command stream). Clip control codes also are provided in flags field 83 as detailed later. A CLIP_WALKER flag in field 83 determines whether the provided clip control codes are honored or not. The length field indicates three longwords follow header 75.

The third longword of the LOAD_CLIP command is formed of an X Max field and an X Min field. The X Max field provides the X coordinate of the rightmost pixel which can be drawn in this clip rectangle. The X Min field provides the X coordinate of the leftmost pixel which can be drawn in this clip rectangle. Address generator 196 loads these values into registers 67 in FIG. 3B.

The second and fourth longwords of the LOAD_CLIP command provide a Y Min Offset field and a Y Max Offset field. The Y Min Offset field provides the byte offset, relative to DEST_Y_ORIGIN, of the uppermost scanline which can be drawn in the clip rectangle being processed. The Y Max Offset field provides the byte offset, relative to DEST_Y_ORIGIN, of the lowermost scanline which can be drawn in the clip rectangle being processed. When the LOAD_CLIP command is executed, the Y_MIN_CLIP and Y_MAX_CLIP registers are loaded with the respective sums of DEST_Y_ORIGIN and the appropriate offset.

FIG. 5J illustrates the SET_CLIP_LIST command format. The SET_CLIP_LIST command loads a pointer to the current clip list and/or changes the enabled state of the clip list. In the header of the SET_CLIP_LIST command, the SET_CLIP_LIST command is indicated in the operation code field. The length field indicates that one longword follows the header. A clip list address is held in that following longword. This address is the physical address of a desired clip list in command buffer 145 (FIG. 2). This address is held in two parts—an offset in save clip register 320, and a base address of the block of memory in which clip list buffer 145 resides as indicated in clip base register 318.

The SET_CLIP_LIST command flags field 83 is similar to that of LOAD_CLIP in FIG. 5I.

FIG. 5K illustrates a destination setup command format. The DEST_SETUP command describes the location and geometry of the DESTINATION operand. The DEST_SETUP command is used once each time a new DESTINATION operand is selected. The DEST_SETUP command can be inserted in the clip list to cause automatic redrawing to multiple memories.

The header 75 of the DEST_SETUP data packet includes four fields. The operation code field indicates that this command is for a DEST_SETUP command. The flags field 83 includes a VIRTUAL flag which, when set, indicates that the DEST_Y_ORIGIN field holds a virtual address. When the VIRTUAL flag is clear, the DEST_Y ORIGIN field holds a physical address. Flags field 83 also provides clip control codes described later. The length field is set to indicate that two longwords follow the header 75 in the DEST_SETUP command.

The second longword of the DEST_SETUP command is formed of a DEST_Y_ORIGIN field. This field holds the memory address of the scanline corresponding to Y=0 in the destination coordinate space. The starting scanline address for a raster operation is computed by the address generator 196 as the sum of the contents of this field and the contents of the DEST_Y_OFFSET field of the given raster operation. LOAD_CLIP command offsets are also added to DEST_Y_ORIGIN as mentioned above. The DEST_Y_ORIGIN field is useful, for example, for reestablishing value of DEST_Y_ORIGIN without changing Y_step.

The third longword of the DEST_SETUP command is formed of a DEST_Y_step field. This field holds the linear byte offset between vertically adjacent pixels in the DESTINATION operand. For eight-plane operands, this is a byte offset. For one-plane operands, this is a bit offset. The graphics control unit 130 adjusts the DEST_SCANLINE_ADDRESS by the value held in the DEST_Y_step field after each scanline in a rester operation to advance to the next scanline.

Figure 5L:
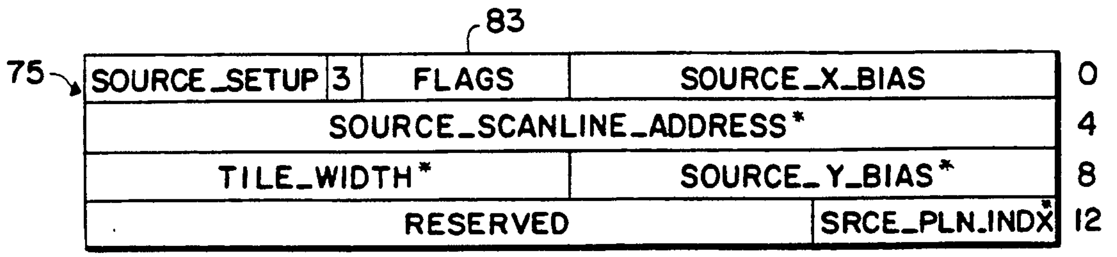

FIG. 5L illustrates the SOURCE_SETUP command format. The SOURCE_SETUP command describes the location and geometry of the source operand. This command is also used to establish the Y and the relative X-Position of the SOURCE operand of a raster operation function. To that end, this command controls translation between the source and destination coordinate spaces.

The header 75 of the SOURCE_SETUP command provides in the operation code field 87 an indication of the SOURCE_SETUP command. The flags field 83 includes AUTOMOD and VIRTUAL flags among clip control codes (discussed later). The AUTOMOD flag is used in conjunction with tiles. When this flag is set, address generator 196 interprets the source_X_bias field as the bias to use if DEST_X equals zero. The address generator 196 then computes the appropriate bias for the actual DEST_X. When the AUTOMOD flag is clear, the address generator 196 interprets the contents of the source_X_bias field as the one to use with the initial DEST_X and no computation is necessary. When the VIRTUAL flag is set, the contents of the source_scanline_address field is a virtual address. When the contents of the source_scanline_address field is a physical address, the VIRTUAL flag is clear (0). Address generator 196 stores the contents of this address field as source_Y_base. The source_X_bias field is the least significant 16 bits of the header of the SOURCE_SETUP command. The value held in this field is to be added to DEST_X to determine the pixel offset from the source_scanline_address. The correct value for source_X_bias field depends on the source bit alignment and the translation between the source and destination address spaces. When the source is a tile, the source_X_bias field reflects the tile rotation. The length field indicates three longwords follow header 75.

The second longword of the SOURCE_SETUP command provides the SOURCE_SCANLINE_ADDRESS field. This field holds the address of the first source scanline to be referenced in the next raster operation. The address is the source scanline corresponding to DEST_Y_OFFSET specified in the next raster operation command.

The third longword of the SOURCE_SETUP command format provides a tile width field and a SOURCE_Y_SETUP field. The tile width field holds the logical width of a tile and is an optional field used for tiles only. That is, the value of this field is only used by the address generator 196 when the action field of an OP_SETUP command is set to XXX_Tile.

The SOURCE_Y_step field holds the byte offset between the vertically adjacent pixels in the source operand. The graphics control unit 130 adjusts the SOURCE_SCANLINE_ADDRESS field by this value after each scanline in a raster operation to advance to the next scanline.

Tiles and stipple widths are padded by one full access size. That is, the first access size pixels of the desired pattern immediately follow the last pixel of the pattern. The SOURCE_Y_step field value is set to the naturally aligned access size block at or beyond the padded width. The access size is four bytes for one-plane operands (stipples) and sixteen bytes for eight-plane operands (tiles). The value of the SOURCE_Y_step field for a tile operand (of depth 8, width W+16) is computed by logically ANDing the sum of (W+31) and 0XFFF0. To compute the value of the SOURCE_Y_step field for a stipple operand (depth 1, width W+32), the sum of W+63 is logically ANDed with 0XFFE0 and the results are shifted right three bits. To compute the value of the SOURCE_Y_step field for a rectangle operand (depth 8, width W), the sum (W+3) is logically ANDed with OXFFFC. The SOURCE_Y_step field value for a rectangle operand (depth 1, width 2) is computed by logically ANDing the sum (W+31) and the word 0XFFE0 and shifting the results by three bits to the right.

The fourth longword of the SOURCE_SETUP command is formed of a source plane index field. This field holds the number of the source plane to use for operations which require a single-plane source but the source operand is multi-plane. Planes are numbered starting at zero (0), the least significant bit of each pixel. This field is only useful when the action field of an OP_SETUP command specifies an EXTRACT operation.

Figure 5M:
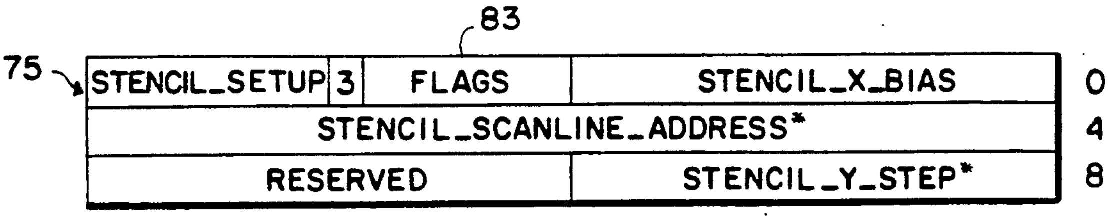

FIG. 5M illustrates the command format for the STENCIL_SETUP command. The STENCIL_SETUP command describes the location and geometry of the STENCIL operand. While the DESTINATION operand specifies Y using an origin/offset scheme, the STENCIL_SETUP command specifies a SCANLINE_ADDRESS. The SCANLINE_ADDRESS is the address of the scanline in the stencil corresponding to the first scanline of the destination to be processed in the next drawing operation. The STENCIL_SETUP command must be used to reset the SCANLINE_ADDRESS whenever a new DEST_Y_offset is specified in a raster operation packet. The header 75 of the STENCIL_SETUP packet is formed of an operation code field, a flags field 83, a length field, and a stencil X-bias field. The operation code field indicates that this is a STENCIL_SETUP command packet. The flags field 83 includes a virtual flag which, when set, indicates that the stencil_scanline_address is a virtual address When the flag is clear, the stencil_scanline_address is a physical address. Address generator 196 stores the contents of this address field as stencil_Y_base. The length field as illustrated indicates that two longwords follow the header 75.

The second longword is formed of the stencil_scanline_address field which holds the memory address of the stencil scanline corresponding to the first destination scanline to be accessed during the next raster operation. The horizontal and vertical translation of the stencil coordinate space relative to the destination is typically fixed for the valid lifetime of a sequence of graphics commands. However, a STENCIL_SETUP command must be issued whenever the DEST_Y_OFFSET is specified so that the starting STENCIL_SCANLINE_ADDRESS can be established.

The third longword of the STENCIL_SETUP command is formed of a stencil_Y_step field. This field holds the byte offset between vertically adjacent pixels in the STENCIL operand. For eight-plane operands, this is a byte offset. For one-plane operands, this is a bit offset. The graphics control unit 300 adjusts the stencil_scanline_address field value by the byte equivalent of the value in the stencil_Y_step field after each scanline in a raster operation to advance to the next stencil scanline.

Figure 5N:
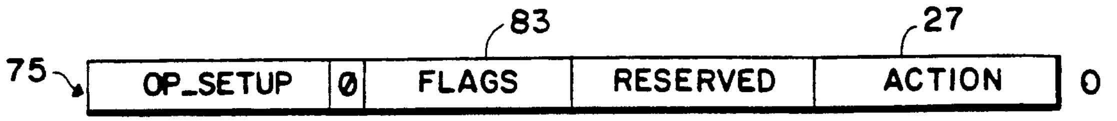

An operation setup (OP_SETUP) command specifies the number of operands to use, whether to tile, and which depth conversion should be used, if any. Bit flags in the operation setup command also control transparency, color expansion/replacement and selection between the graphics data buffer 365, the foreground and background registers 65, 73. The parameters of the operation setup command apply to all subsequent operations until the next OP_SETUP command is executed. The particulars of the OP_SETUP command are illustrated in FIG. 5N.

In header 75, the operation code field is set to indicate that the command is an operation setup command. The flags field includes three flags, PIXEL_EXPAND, USE_GDB, and TRANSPARENCY. The PIXEL_EXPAND flag applies only to one-plane data in the graphics data buffer 204. When this flag is set, bits are expanded to pixels before being passed to the Pixel SLU 172. Each one bit in the graphics data buffer 204 is replaced with foreground register pixel value, and each zero bit in the graphics data buffer 204 is replaced with background register pixel value. The USE_GDB flag, when set, provides graphics data buffer data or color-expanded graphics data buffer data to be delivered to the Pixel SLU 172. When this flag is clear, the foreground register value is delivered to the SLU 172. This flag exists so that pre-loaded graphics data buffer data can be used in place of foreground pixel value and background pixel value during fill operations. The TRANSPARENCY flag controls whether the SOURCE operand bits are included in write mask generation. This flag is only useful for one-plane sources. When the flag is set, destination pixels which correspond to zero bits in the source are not modified.

The length field indicates that there are no succeeding longwords in the OP_SETUP command. The least significant eight bits of the OP_SETUP command provide an ACTION field 27. This field 27 encodes a value which determines which address generator flow is selected. The encoding includes the number and depth of the operands, whether tiling is performed, and whether plane extraction is performed. In the preferred embodiment, the allowed values of the ACTION field 27 are as listed in Table I of the Appendix.

Other graphics commands of the preferred embodiment are illustrated in FIGS. 5O through 5R.

Figure 5O:
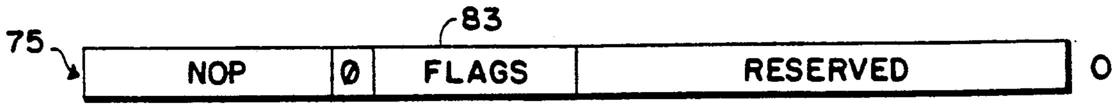

FIG. 5O illustrates the NOP command format. This command is used for padding and carrying a number of important flags. The NOP command format comprises the header 75 and is thus one longword long. The operation code field indicates the NOP command, and the length field indicates that no longwords follow the header 75. The flags field 83 includes flags halt, interrupt and wait_for_vsynch. The halt flag halts address generator 196 so that no further command packets are executed until the CPU 104 restarts the address generator 196 via a register write. The interrupt flag sends an interrupt to the CPU 104 upon execution of this command packet.

The wait_for_vsynch flag stalls execution of the following command packet until the video scan out of the current frame is completed in display device 116

(i.e., vertical synchronization). This feature allows for drawing to be queued after a change in the color table. The LOAD_LUT command (discussed later) itself does not take effect until the following video synchronization signal. This flag makes it possible to coordinate drawing with the color change by delaying further drawing until the next video synchronization signal. This flag can also be used to facilitate smooth animation.

In addition, clip control codes are provided in 3 bits of the flags field 83. The values of the clip control codes are interpreted differently depending on whether the NOP command packet is being executed from the FIFO command buffer 141 or the clip list command buffer 145. The commonly used values of the clip control codes for drawing unit control (as made clearer later) are as follows.

The value "begin_drawing_unit" saves a pointer, indicated in save head register 322, to the beginning position of a drawing unit in FIFO command buffer 141, and sets the "in drawing unit" state to TRUE. The "begin_drawing_unit" value also toggles or changes execution streams between the FIFO command buffer 141 and the clip list command buffer 145. The value "end_drawing_unit" in the clip control codes provide a conditional expression depending on the "in drawing unit" state. In particular, if the "in drawing unit" state is TRUE, then the "end_drawing_unit" value of the clip control codes restores the save head register 322 and toggles (changes) execution streams between the FIFO command buffer 141 and the clip list command buffer 145. The reason for toggling between execution streams at this point is to cause the next clip rectangle to be loaded prior to re-execution of the drawing commands. If the "in drawing unit" state is NOT TRUE, then the "end_drawing_unit" value of the clip control codes provides no operation. The "transition_drawing_unit" value of the clip control codes provides the following. If the "in drawing unit" state is TRUE, then the save head register 322 is restored and the execution stream is toggled (changed) between the FIFO command buffer 141 and the clip list command buffer 145. Otherwise, the save head register 322 is set to indicate a particular drawing unit and the "in drawing unit" state is set to TRUE, and the execution stream is changed (toggled) between the FIFO command buffer 141 and the clip list command buffer 145.

Three commonly used values for the clip control codes in clip unit control are as follows. The "save_clip_list_offset" value of the clip control codes saves a pointer to a current clip list. In particular, the clip list save register 320 is set to indicate the pointer. The "end_clipping_unit" value of the clip control codes provides a toggle or change in execution streams between the FIFO command buffer 141 and the clip list command buffer 145. The "end_clip_list" value of the clip control codes restores the clip list save register 320, resets the "in drawing unit" state to FALSE, and toggles execution streams between the FIFO command buffer 141 and the clip list command buffer 145.

These clip control codes are also provided in the flags field 83 of the LOAD_CLIP, SET_CLIP_LIST, SOURCE_SETUP, DEST_SETUP, ROP_GLYPH, ROP_RECT, and DRAW_LINE commands. And the foregoing values are interpreted as described above depending on whether the command is being executed from the FIFO command buffer 141 or the clip list command buffer 145.

Figure 5P:
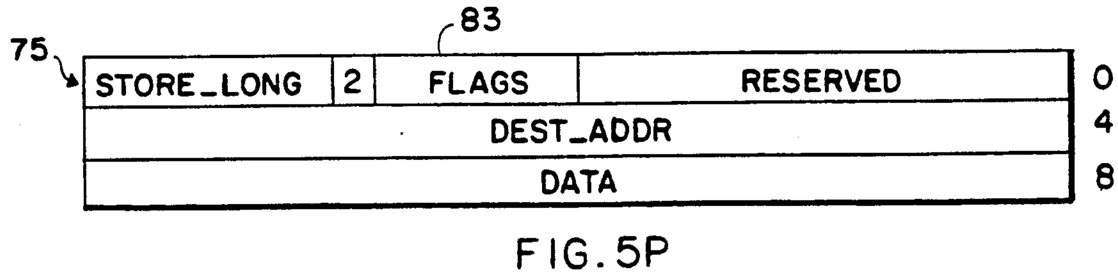

FIG. 5P illustrates the format for the command STORE_LONG. This command stores a longword literal at an arbitrary longword address. In particular, this command is used to load the base address register 31 and provide the y offset value to address generator 196. The first longword of the command is header 75. The most significant 8 bits of header 75 provide an OPcode indicating the command STORE_LONG. The length field indicates that two longwords follow the header 75. Flags field 83 includes a virtual flag which when set indicates that the address in the longword following header 75 is a virtual address. When clear, the stored address is a physical address. Flags field 83 also includes an interrupt flag similar to that described in the NOP command of FIG. 5O.

The longword following header 75 of the STORE_LONG command format holds a memory address at which to store the data provided in the second longword following header 75. That data is generally a one longword data value.

Figure 5Q:
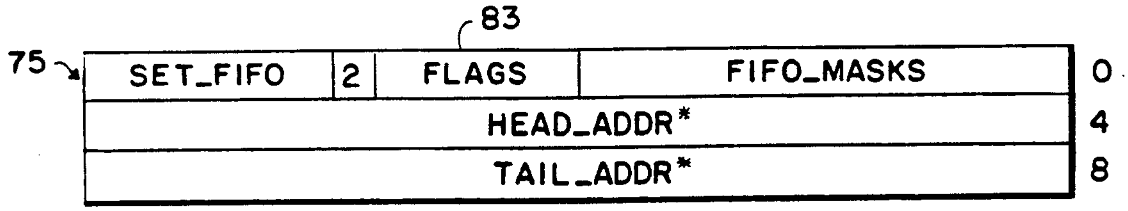

FIG. 5Q illustrates the command format for the SET_FIFO command. This command moves the memory area in which the FIFO command buffer 141 resides, and sets the size and interrupt masks discussed in the cofiled Application. This command can be used to change from one FIFO memory area to another. Header 75 of the SET_FIFO command format indicates the command in the most 8 significant bits. The FIFO masks are indicated in the least significant 16 bits of header 75. The length field indicates that two longwords follow header 75.

The longword following header 75 holds the physical address of the next executable command. That address is held in FIFO head index register 316 (FIG. 2). The third longword of the SET_FIFO command format holds the physical address of the next writable location in the FIFO command buffer 141. This address is held in the FIFO tail index register 312 of FIG. 2.

Figure 5R:
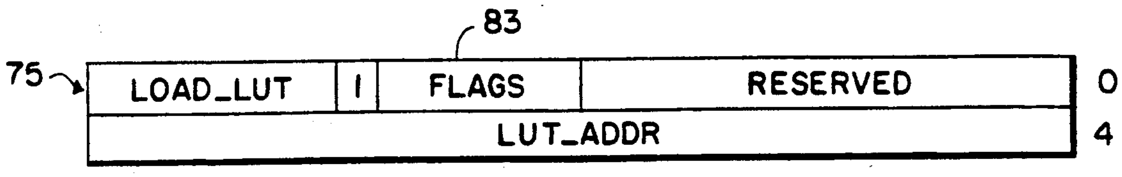

FIG. 5R illustrates the format for command LOAD_LUT. This command specifies the frame buffer memory 151 address of the color lookup table data which will be loaded by the DAC 152 after the next frame is displayed on display device 116. Header 75 of the LOAD_LUT command format indicates the command in the most significant 8 bits, and indicates the length of the command format to be one longword following the header 75. Flag field 83 includes the wait_for_vsynch flag discussed in the NOP command format of FIG. 5O. The longword following header 75 holds the address in frame buffer memory 151 of the lookup table data.

It is noted that the graphics system 100 of the present invention employs no multiplier. Thus, Y coordinates are expressed in terms of scanline addresses. A variable, SCANLINE_ADDRESS, holds the address of the beginning of the scanline associated with a given Y. For SOURCE and STENCIL operands, the SCANLINE_ADDRESS is the address of the scanline to be used at the start of the next draw operation. That is, SCANLINE_ADDRESS is the address of the SOURCE or STENCIL operand scanline used when modifying the initial scanline of the destination.

SCANLINE_ADDRESS is provided for each drawing operation unless the draw operation is relying on the internal state from the previous draw operation. In the preferred embodiment, for SCANLINE_ADDRESS (Y base addresses), the hardware maintains no differential between the destination and the other operands. For SOURCE and STENCIL operands, SCANLINE_ADDRESS is computed in software and passed directly to the hardware. Note that for stencils, the translation between the STENCIL operand and destination coordinates space is fixed for a predetermined length of time. However, the present invention executes the STENCIL_SETUP command to establish SCANLINE_ADDRESS whenever an explicit DEST_X will be supplied in a drawing command data packet. Also, the STENCIL_SETUP command is required whenever DEST_Y_OFFSET is provided in a drawing command.

The graphics system of the present invention maintains the SCANLINE_ADDRESSes for each of the three operands (SOURCE, DESTINATION, and STENCIL) as it draws. At the end of a raster operation, these SCANLINE_ADDRESSes normally point to the scanline following the one containing the last drawn pixel. As a result, trivial commands, such as ROP_POINT and ROP_RECT (used to draw a span), can progress through a series of scanlines without explicitly specifying new SCANLINE_ADDRESSes for each of the three operands. Similarly, a series of PIXEL commands can progress across a scanline without explicitly specifying X coordinates. This is due to the X_update flag in the command which, when set, provides DEST_X to be incremented by one after the draw operation.

Further, it is noted that the flags in the drawing command data packets include one flag to control Y direction, one flag to inhibit SCANLINE_ADDRESS updates, one flag to control X direction, and one flag to inhibit DEST_X updates.

Further, the drawing commands specify offsets from an origin (the value held in the DEST_Y_origin field) of the DEST_SETUP command for specifying the DESTINATION operand. The origin is defined as the address of the scanline at which Y=0 in the destination memory space. Thus, the origin serves as a base address. As a result, the base address approach of the present invention allows for the same drawing commands to execute against multiple destination memories so long as the destination memories have equal Y_steps (i.e., the width of a scanline in operand memory or the number of bits to effect changing from an x position in scanline Y to the same x position in scanline Y+1).

By exploiting the foregoing features, software algorithms which output points, pixels or spans can draw with a minimum of command data packet overhead. Such savings in the present invention graphics system is heretofore not achieved by graphics systems of the prior art.

Example uses of the graphics commands of FIGS. 5A through 5N are as follows. These examples show the complete set of commands required to do the operation assuming no previous context. In practice, many fewer commands are required for each such operation. These examples are for purpose of illustration and not limitation. Further from these examples, it is understood that one of ordinary skill in the art would be able to formulate desired uses of these graphics commands.

EXAMPLE 1

Simple Rectangle Fill

If one desires to fill a rectangle area in a certain window displayed on the screen of display device 116 (FIG. 1), the following sequence of graphics commands is performed, where each linear longword of a command appears on a separate line and fields of that command are separated by colons.

Example 1 Code

```
PIXEL:0:no draw:foreground val
LOAD_PLANE_MASK:1: —
PLANEMASK
LOAD_LU_FUNC:0:COPY
DEST_SETUP:2:dest_X_bias
dest_Y_origin
    —        :dest_Y_step
LOAD_CLIP:3: —
        Y_min_offset
X_max:X_min
        Y_max_offset
OP_SETUP:0:multi_fill
ROP_RECT:2:DEST_X
height:width
dest_Y_offset
```

The first line in the above example is a PIXEL command specifying a pixel value for foreground color. The address generator 196 loads this pixel value into foreground register 65 in FIG. 3B. The no_draw flag is set in this PIXEL command and indicates that the PIXEL command is being used to just load the foreground register 65. A desired plane mask is provided to address generator 196 by the next two lines in the above example. The following command (LOAD_LU_FUNC) loads the desired logic function, namely the copy function. The next three lines set up the pertinent operands which in this case is only the DESTINATION operand. The rectangular area of interest in the destination space is specified by the LOAD_CLIP command. The contents of the X_max field is set equal to the width of the desired clip rectangle. The X_min field is set to the pixel position of the left edge of the clip rectangle. The Y_min_offset field is set equal to the product of the minimum Y of the clip rectangle and dest_Y_step defined by the previous command. The Y_max_offset field is set equal to the product of the dest_Y_step from the DEST_SETUP command and the height specified in the subsequent raster operation command.

In the lines following the LOAD_CLIP command is a command to set up the desired operation. In particular, the OP_SETUP command specifies the plane depth and type of operation. In this example, the action field of the OP_SETUP command is set to "multi_fill" which provides filling 8 bits deep. Since the USE_GDB flag is not set here, the multi_fill operation will use a pixel value defined by the foreground register 65 which was set by the pixel command in the first line.

The lines following the OP_SETUP command is a ROP_RECT command which places into effect the actual operation. This command specifies the height, width, and starting pixel position (DEST_X) directly from the values transmitted by the client (CPU 104). The Y dimension for this operation is specified as an offset (dest_Y_offset) which has a value equal to the product of the Y_step value from the DEST_SETUP command and the destination scanline (Y) specified by the client. Address generator 196 takes the dest_Y_offset value from the ROP_RECT command and adds that value to the dest_Y_origin value specified in the DEST_SETUP command, and stores the result in the destination base address 31 of FIG. 3A. Address generator 196 subsequently uses the dest_Y_base value in base address register 31 as the starting address to generate addresses as described in FIG. 3A.

Address generator 196 stores in min Y register 67 (FIG. 3B) the sume of Y_min_offset from the LOAD_CLIP command and Y_origin from the DEST_SETUP command. Also, address generator 196 stores in max Y register 67 (FIG. 3B) the sum of Y_max_offset from the LOAD_CLIP command and Y_origin from the DEST_SETUP command.

It is noted that the raster operation command to fill a rectangle for one plane destinations is the same as that for multiplane destinations. The difference in execution of raster operations for these two types of destinations is specified in the destination setup command Y_step value and in the OP_SETUP command ACTION field 27 value which specifies multi or mono functions for multiplane or monoplane destinations, respectively.

EXAMPLE 2

Copy

If one desires to copy a pattern, for example, Pattern 89 in FIG. 6, from a desired source to the same window 91 as that involved in Example 1 above, the following commands are issued subsequent to the commands of Example 1. It is noted that because the destination (desired window 91) among other attributes of the context set in Example 1 are unchanged for the current operations, the PIXEL, LOAD_PLANE_MASK, LOAD_LU_FUNC, DEST_SETUP, and LOAD_CLIP commands need not be repeated. To that end, the registers defined by those commands maintain the same values from the command sequence of Example 1 through the command sequence of Example 2. This also holds true for different registers defined by different context commands independent of the other context commands. Further, in the ROP_RECT command, the Y_NO_UPDATE flag was clear, such that the scanline address for each involved operand (DESTINATION in this case) was updated by the Y_step. Thus, the next drawing command begins on the destination scanline succeeding the last scanline in the destination space drawn to in Example 1.

Example 2 Code

```
OP_SETUP:0:multicopy
SOURCE_SETUP:2:src_Y_bias
src_Y_bias
    —   :   src_Y_step
ROP_RECT:2:DEST_X
    H  :  W
    Y_offset
```

This sequence of commands begins with the OP_SETUP command to change from the previous Example 1, "Multifill" operation to the "multicopy", operation. The next command (SOURCE_SETUP) defines the source space of desired pattern 89. In particular, the SOURCE_SETUP command specifies the scanline in the source memory 95 on which desired pattern 89 begins, and the width of source memory 95. These two values are specified by source_Y_base and source Y_step, respectively. The source X-bias is then defined as the difference between the source X transmitted by the client (CPU 104) and the DEST_X defined in the succeeding ROP_RECT command. This illustrates that all bias values describe the relationship between the specified operand's X and the destination X (DEST_X).

A ROP_RECT command follows the SOURCE_SETUP command and provides the actual raster operation desired as discussed above in Example 1.

Further, so long as the Y_offset of a second or more sources is the same, then one can use the specifications made by the foregoing SOURCE_SETUP command. To that end, to specify additional sources respective SOURCE_SETUP commands for the additional desired sources employ a shortened variant of the command. In particular, such subsequent commands do not respecify the Y_step field which is already set as desired from the previous SOURCE_SETUP command. Thereafter, the ROP_RECT command is repeated for each of the different sources (source rectangles) desired to be involved. Likewise, when within the same source and in particular on the same scanline one desires to execute raster operations at different X positions, the SOURCE_SETUP command does not need to be respecified. Again, this is due to the values specified by the SOURCE_SETUP command being held and maintained in respective registers until a succeeding SOURCE_SETUP command is provided, even across plural raster operations. All that is required to be repeated are the raster operation commands desired.

EXAMPLE 3

Stencil Copy

To provide stenciling in the window 91 after Example 1, the following sequence of commands are used.

Example 3 Code

```
OP_SETUP:0:multistencil_copy
SOURCE_SETUP:2:src X_bias
    src_Y_base
    —   :   src_Y_step
STENCIL_SETUP:2:stencil X_bias
    stencil_Y_base
    —   :   stencil Y_step
ROP_RECT :2:Dest_X
    H  :  W
    Y_offset
```

The OP_SETUP command indicates that a multistencil copy operation is to be executed next. The SOURCE_SETUP command specifies the particulars of source 95 as described above in Example 2. The STENCIL_SETUP command specifies particulars of the desired stencil 90 in a stencil memory 99 as illustrated in FIG. 6. In particular, the stencil_Y_base is the scanline in stencil memory 99 on which stencil 90 begins. Stencil Y_step is the width of the stencil memory 99. The stencil X_bias is the difference between the stencil X value provided by the client and DEST_X defined in the succeeding ROP_RECT command. It is noted that the SOURCE operand and STENCIL operand are both incremented through their respective Y_step values specified in the SOURCE_SETUP and STENCIL_SETUP commands.

To that end, address in source memory 95, address in stencil memory 99, and address in destination memory (e.g., frame buffer 610) of current position within the respective memory spaces during drawing is as follows:

$$\text{Source address} = \text{source\_}Y\text{\_base} + \text{source } X\text{\_bias} + \text{DEST\_}X$$

$$\text{Stencil address} = \text{stencil\_}Y\text{\_base} + \text{stencil } X\text{\_bias} + \text{DEST\_}X;$$

and

Destination address=DEST_$Y$+$DEST_X$_bias+DEST_$X$.

In the case that the destination has multiple clip rectangles of interest, a clip list command buffer 145 is used. The clip list command buffer 145 contains groups of command packets (called a clip unit) which describe the individual clip rectangles of interest. A clip unit which describes a clip rectangle of interest contained in a new destination memory is composed of a DEST_SETUP and LOAD_CLIP command pair. A subsequent clip unit which describes a clip rectangle of interest contained in the same destination memory may be composed of a single LOAD_CLIP command. In any event, a clip unit is stored in clip list command buffer 145 for each specified clip rectangle.

Previous to specifying the desired raster operation commands for operating on the specified clip units, the SET_CLIP_LIST command is utilized. This command specifies the memory address where the clip list command buffer 145 resides. Where a sequence of raster operations is desired for each of the clip rectangles, the sequence is preceded and succeeded by a no-operation command illustrated in FIG. 4. The preceding no-operation command provides a flag indicating the beginning of a drawing unit, i.e., the desired sequence of raster operations. The succeeding no-operation command provides a flag indicating the end of the drawing unit.

This allows memory control unit 130 to control the number of graphics primitives to be executed per clip rectangle. The number of drawing commands executed per clip rectangle is changeable, depending on what is being drawn (for example, vectors, copies, tiles) or on other factors, such as the length or type of graphics commands, the mix of commands, or whether they involve virtual memory addresses or not.

Figure 4:
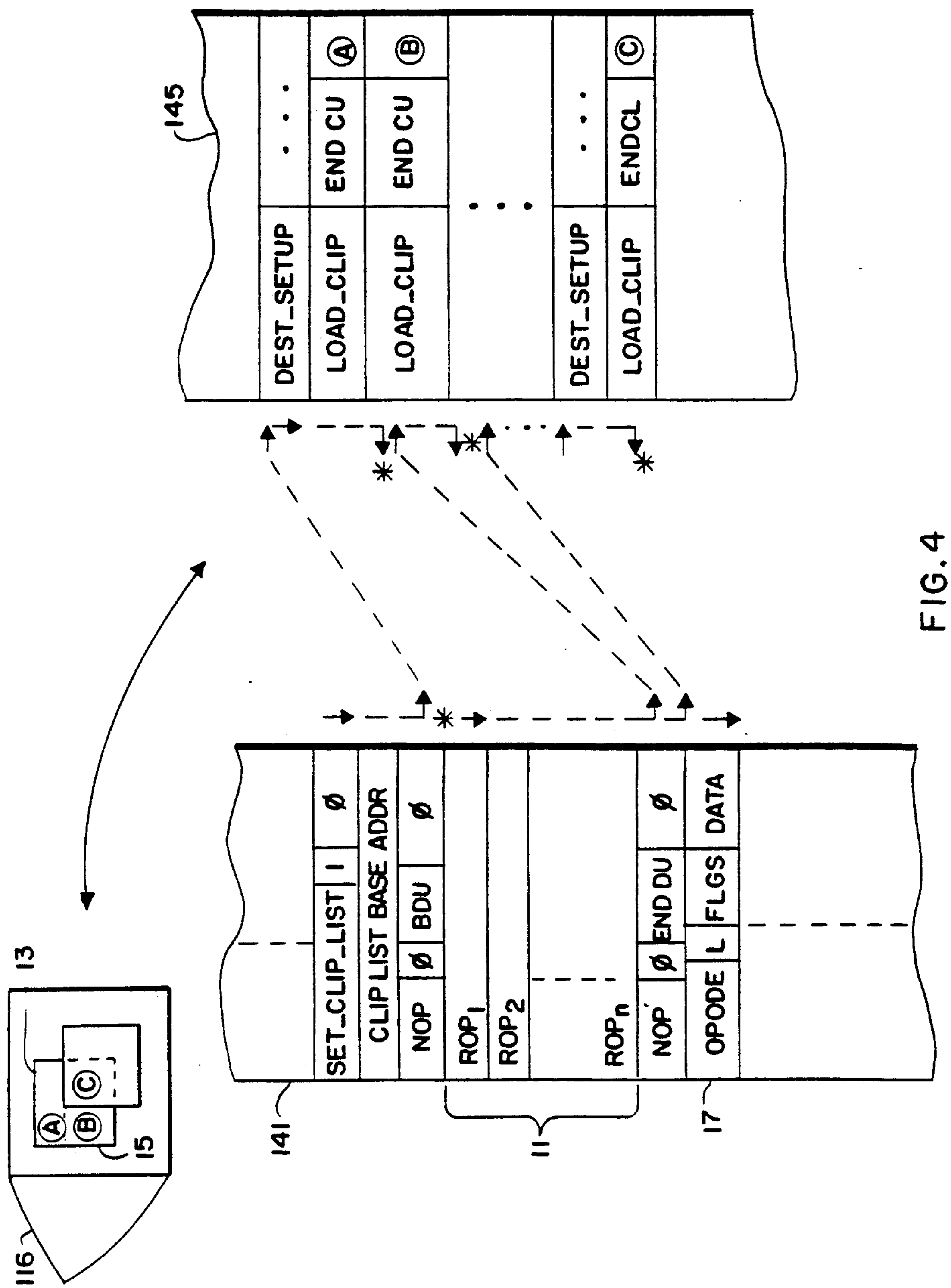
FIG. 4 is a schematic illustration of clip list processing in the computer graphics system of FIG. 1.

Processing of clip list 520 is then as follows and illustrated in FIG. 4.

Data packets/graphics commands from FIFO command buffer 141 are processed one at a time, in order of storage as indicated by FIFO head index register 316 (FIG. 2). When the SET_CLIP_LIST command is pointed to by head index register 316 of FIFO control unit 200, address generator 196 reads the clip list base address specified in the command data packet. That address is stored in clip list base register 318 (FIG. 2). In response to the succeeding no-operation command having a "begin drawing unit" flag set, FIFO control unit 200 sets save head register 322 to point to the current position in FIFO command buffer 141 (indicated by an * in FIG. 4). Moreover, save head register 322 points to the first significant longword in drawing unit 11. In turn, FIFO control unit 200 sets the "in drawing unit" state to TRUE and toggles to clip list base address in register 318 augmented by (logically ORed with) save clip register 320, to begin reading data packets (graphics commands) from clip list command buffer 145. The graphics command in clip list command buffer 145 to be currently executed is pointed to by clip index register 319 and is a DEST_SETUP command which specifies the destination space to which the current drawing unit 11 is to be applied. FIFO control unit 200 continues to read graphics commands from clip list command buffer 145 while clip list save register 320 is set to the beginning of the current clip list. Following the initial DEST_SETUP command, a LOAD_CLIP command is processed. The LOAD_CLIP command indicates a desired clip rectangle illustrated in FIG. 4 as the frame buffer RAM 151 for supporting display unit 116. An "end CU" (end clip unit) flag is set in the LOAD_CLIP command. In response, FIFO control unit 200 returns to FIFO command buffer 141 at the position indicated by the head index register 316. As a result, FIFO control unit 200 processes, for the most recently read clip unit, the sequence of raster operations following the no-operation command at the beginning of the sequence and stops processing upon reaching the no-operation command with an end DU flag set. Throughout this processing FIFO head index 316 is incremented from $ROP_1$, to $ROP_n$ in FIG. 4.

In response to the end DU flag, while "in drawing unit" is TRUE, FIFO control unit 200 restores FIFO head index 316 to the save head 322 position and returns to clip list command buffer 145 to the graphics command following the last processed graphics command in the clip list command stream. As illustrated in FIG. 4, the graphics command to which FIFO control unit 200 returns in clip list command buffer 145 is a LOAD_CLIP command specifying clip rectangle 15. That LOAD_CLIP command has an end CU flag set which, in turn, causes FIFO control unit 200 to return to the position in FIFO command buffer 141 to which the FIFO head index register 316 currently points. In this case, the pointer remains pointing to the sequence of raster operations in drawing unit 11. FIFO control unit 200 processes these raster operations for clip rectangle 15. Upon reaching the no-operation command with the end DU flag set succeeding the last raster operation of drawing unit 11, FIFO control unit 200 returns to the clip list command buffer 145 (as before) to process the next unprocessed clip list graphics command indicated by clip index register 319.

The foregoing processing of drawing unit 11 for a most recently specified clip rectangle (from the last processed LOAD_CLIP command in clip list command stream) continues until a LOAD_CLIP command with an "end CL" (end clip list) flag set is processed. That LOAD_CLIP command is necessarily the last command in clip list command buffer 145 As such, FIFO control unit 200 restores save clip register 320 and resets the "in drawing unit" state to FALSE. FIFO control unit 200 then returns to FIFO command buffer 141 to the position indicated by FIFO head index register 316. FIFO control unit 200 processes the raster operations of drawing unit 11. Upon reaching the no-operation command following the last raster operation of drawing unit 11, FIFO control unit 200 tests the state of "in draw unit" which was set to FALSE in response to the "end clip list" flag of the last processed LOAD-CLIP command. In turn, FIFO control unit 200 proceeds to the next command 17 in FIFO command buffer 141 (i.e., resets save head register 322 and set head index register 316 to point to command 17), and continues processing as described previously.

According to the foregoing, the present invention clip list processing method has the advantage that the clip list itself and the comparison instructions are written to a memory only once. Thereafter, the clip list and the comparison instructions are processed as memory is read. In the prior art, the clip list and the comparison instructions are explicitly written into the command stream every time a figure is drawn. In addition, the present invention clip list processing method has the advantage of processing fewer instructions.

In sum, the address generator 196 of the present invention accepts data packets (graphics commands) from the FIFO command buffer 141 and executes them by requesting memory reads and writes and by controlling the other megacalls in the graphics control unit 130. The graphics operations supported are rectangular raster operations and line drawing, although the former supports numerous variations. The address generator 196 controls the rest of the graphics control unit 130 using one control bus per component and a general bus which can broadcast to all components. In particular, the present invention address generator 196 generates STENCIL, SOURCE and DESTINATION addresses for graphics operation accesses as well as control signals for the rest of the graphics data path.

Further, address generator 196 uses a minimum number of gates and issues graphics requests as quickly as possible. A balance is struck between these two achievements by parallelling several classes of operations including Y-base operations, X-coordinate operations, clipping operations, width calculations, and shift-count generation.

EQUIVALENTS

While the invention has been particularly shown and described with reference to a preferred embodiment thereof, it will be understood by those skilled in the art that various changes in form and details may be made therein without departing from the spirit and scope of the invention as defined by the appended claims.

TABLE I

APPENDIX

OP_SETUP.ACTION values

| Value | Meaning |
|---|---|
| MULTI_FILL | If flag USE_GDB is clear, fills a full-depth destination with the foreground register value. If flag USE_GDB is set, fills a full-depth destination with the contents of the graphics data buffer. |
| MONO_FILL | If flag USE_GDB is clear, fills a 1-plane destination with the foreground register value. If flag USE_GDB is set, fills a 1-plane destination with the contents of the graphics data buffer. Note that when the destination is 1-plane, foreground and background registers must be filled with the desired bit value replicated 8 times. |
| MULTI_COPY | Copies a full-depth (8-plane) source to full-depth destination. |
| MULTI_TITLE | Replicates (horizontally) a full-depth tile pattern into a full-depth destination. |
| EXTRACT_COPY | Extracts one plane from a full-depth source and copies it to a 1-plane destination. Monochrome color replacement can be accomplished by asserting flag PIXEL_EXPAND and loading foreground and background registers as for a monochrome system. |
| EXPAND_COPY | Expands a 1-plane source into a full-depth destination using foreground register value for each 1-bit in the source and background register value for each 0-bit in the source. If flag TRANSPARENCY is asserted, only pixels corresponding to 1-bit in the source are modified. |
| EXPAND_TILE | Expands a 1-plane stipple pattern using foreground and background register values and replicates it into a full-depth destination. If flag TRANSPARENCY is asserted, only pixels corresponding to 1-bits in the source are modified. |

TABLE I-continued

APPENDIX

OP_SETUP.ACTION values

| Value | Meaning |
|---|---|
| MONO_COPY | Copies a 1-plane source to a 1-plane destination. Color substitution can be accomplished by asserting flag PIXEL_EXPAND and foreground and background registers with the replicated bit-values corresponding to foreground and background color. |
| MONO_TILE | Replicates (horizontally) a 1-plane stipple pattern to a 1-plane destination. If flag TRANSPARENCY is asserted, only pixels corresponding to 1-bit in the source stipple pattern are modified. |
| MULTI_STENCIL_COPY | Copies a full-depth source to a full-depth destination "through" a stencil bitmap. That is, destination pixels corresponding to 1-bits in the stencil are replaced by the corresponding source pixel. Destination pixels corresponding to 0-bits in the stencil are not modified. |
| MULTI_STENCIL_TILE | Replicates (horizontally) a full-depth tile pattern to a full-depth destination "through" a stencil bitmap. That is, destination pixels corresponding to 1-bits in the stencil are replaced by the corresponding tile pixel. Destination pixels corresponding to 0-bits in the stencil are not modified. |
| EXPAND_STENCIL_COPY | Expands a 1-plane source, using foreground and background register values to a full-depth destination "through a stencil bitmap. That is, destination pixels corresponding to 1-bits in the stencil are replaced by the corresponding color-expanded bit in the source. Destination pixels corresponding to 0-bits in the stencil are not modified. If flag TRANSPARENCY is set, then the effect is as if the stencil were the intersection of the source and the stencil. That is, both the source and stencil bits must be set for the corresponding destination pixel to be modified. Transparency is orthogonal to color expansion. |
| EXPAND_STENCIL_TILE | Expands a 1-plane stipple pattern using foreground and background register values and replicates it (horizontally) into a full-depth destination "through" a stencil bitmap. If flag TRANSPARENCY is set, then the effect is as if the stencil were the intersection of the source and the stencil. That is, both the source and stencil bits must be set for the corresponding destination pixel to be modified. Transparency is orthogonal to color expansion. |
| MONO_STENCIL_COPY | Copies a 1-plane source to a 1-plane destination "through" a stencil bitmap. If flag TRANSPARENCY is clear, and flag PIXEL_EXPAND is clear then the following occurs: Destination pixels corresponding to 1-bits in the stencil are replaced with the corresponding bit in the source. If flag TRANSPARENCY is clear, and flag PIXEL_EXPAND is set then the following occurs: Destination pixels corresponding to 1-bits in the stencil are replaced with |

TABLE I-continued

APPENDIX

OP_SETUP.ACTION values

| Value | Meaning |
|---|---|
| | foreground register value if the source bit is 1 and background register value if the source bit is 0. If flag TRANSPARENCY is set, then the effect is as if the stencil were the intersection of the source and the stencil. That is, both the source and stencil bits must be set for the corresponding destination pixel to be modified. Transparency is orthogonal to color substitution. |
| MONO_STENCIL_TILE | Replicates (horizontally) a 1-plane stipple pattern to a 1-plane destination "through" a stencil bitmap. |

We claim:

1. In a computer graphics system having graphics commands for providing graphics operations on data, a communication bus, and data packets in which graphics commands are transmitted on the communication bus, a graphics command format comprising:

a multiplicity of fields for specifying parameters of the graphics command, the fields being arranged in a predetermined order such that less commonly used fields are located at an omittable end of the graphics command to enable the length of the graphics command to vary as a function of parameters specified in the graphics command.

2. A computer graphics command format as claimed in claim 1 further comprising a length field for indicating present length of the graphics command.

3. A graphics command as claimed in claim 1 wherein the graphics command format includes a flag for indicating direction of processing along an axis in a working memory.

4. A graphics command as claimed in claim 1 wherein the graphics command format includes a flags field for controlling clip list processing.

5. In a computer graphics system having graphics commands for providing graphics operations on data, a communication bus, and data packets in which graphics commands are transmitted on the communication bus, a graphics command format comprising:

a multiplicity of fields for specifying parameters of the graphics command, the fields being arranged in a predetermined order such that less commonly used fields are located at an omittable end of the graphics command one of the less commonly used fields can be omitted to enable the length of the graphics command to vary as a function of parameters specified in the graphics command; and a flag for inhibiting automatic updating of a scanline in working memory.

6. In a computer graphics system having graphics commands for providing graphics operations on data, a communication bus, and data packets in which graphics commands are transmitted on the communication bus, a graphics command format comprising:

a multiplicity of fields for specifying parameters of the graphics command, the fields being arranged in a predetermined order such that less commonly used fields are located at an omittable end of the graphics command to enable the length of the graphics command to vary as a function of parameters specified in the graphics command; and a flag for inhibiting automatic updating of pixel position on a given scanline in a working memory.

7. In a computer graphics system having graphics commands for providing desired graphics operations a method of processing graphics commands comprising the steps of:

providing a graphics command format having a multiplicity of fields arranged in order of common use such that fields required for each use of a command are at a beginning of the graphics command format and less commonly used fields are at an end of the graphics command format;

specifying for a first time a graphics command including providing a respective value in each of the multiplicity of fields;

processing the specified graphics command including storing in respective registers the values provided in the fields of the graphics command format;

specifying for a second time the graphics command by providing respective values in a first plurality of fields and by leaving a second plurality of fields unspecified such that length of the desired graphics command is shortened with respect to the first time of specifying the desired graphics command; and transmitting the shortened graphics command as specified the second time for processing thereafter.

8. A method as claimed in claim 7 further comprising the step of processing the graphics command as specified the second time by (i) changing values stored in registers corresponding to the first plurality of fields of the graphics command to store respective values provided in the second specification of the desired graphics command, and (ii) maintaining values from the first specification of the graphics command stored in registers corresponding to the fields left unspecified in the second specification of the desired graphics command such that the graphics command is processed with values for each of the multiplicity of fields of the graphics command format.

* * * * *